(12) United States Patent
Murray et al.

(10) Patent No.: US 11,800,563 B2
(45) Date of Patent: *Oct. 24, 2023

(54) RANDOM ACCESS WITH NEW RADIO UNLICENSED CELLS

(71) Applicant: IPLA HOLDINGS INC., New York, NY (US)

(72) Inventors: Joseph M. Murray, Schwenksville, PA (US); Pascal M. Adjakple, Great Neck, NY (US); Lakshmi R. Iyer, King of Prussia, PA (US); Mohamed Awadin, Plymouth Meeting, PA (US); Allan Y. Tsai, Boonton, NJ (US); Yifan Li, Conshohocken, PA (US); Guodong Zhang, Woodbury, NY (US)

(73) Assignee: IPLA HOLDINGS INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,662

(22) Filed: Jun. 16, 2022

(65) Prior Publication Data

US 2022/0312484 A1   Sep. 29, 2022

Related U.S. Application Data

(63) Continuation of application No. 17/044,979, filed as application No. PCT/US2019/025810 on Apr. 4, 2019, now Pat. No. 11,432,328.

(60) Provisional application No. 62/753,593, filed on Oct. 31, 2018, provisional application No. 62/652,710, filed on Apr. 4, 2018.

(51) Int. Cl.
 H04W 74/08  (2009.01)
 H04W 74/00  (2009.01)
 H04W 72/23  (2023.01)

(52) U.S. Cl.
 CPC ....... H04W 74/0816 (2013.01); H04W 72/23 (2023.01); H04W 74/002 (2013.01); H04W 74/085 (2013.01)

(58) Field of Classification Search
 CPC ....... H02M 1/00; H02M 1/0009; H02P 21/16; H02P 21/18; H02P 21/22; H02P 29/50
 See application file for complete search history.

(56) References Cited

U.S. PATENT DOCUMENTS 10,932,207 B2   2/2021  Suzuki et al.
11,432,328 B2 *  8/2022  Murray ............... H04W 74/085
(Continued)

FOREIGN PATENT DOCUMENTS

WO   2017/171999 A1   10/2017

OTHER PUBLICATIONS

Ericsson: "On interlace design for NR-U uplink", 3GPP Draft; R1-1802776 on Interlace Design for NR-U Uplink, 3rd Generation Partnership Project (3GPP), Feb. 17, 2018.
(Continued)

Primary Examiner — Kashif Siddiqui
(74) Attorney, Agent, or Firm — XSENSUS, LLP

(57) ABSTRACT

A method may perform random access subject to Listen-Before-Talk (LBT) in an NR-U Serving Cell with multiple models. Enhancements may be to the Random Access Preamble Transmission procedure to enable autonomous BWP Switching or sub-band in the event the channel is busy for the active UL BWP.

9 Claims, 29 Drawing Sheets

(56) References Cited

U.S. PATENT DOCUMENTS

| | | | |
|---|---|---|---|
| 2013/0114813 A1* | 5/2013 | Chai | H04L 9/0827 |
| | | | 455/411 |
| 2016/0255658 A1* | 9/2016 | Fujishiro | H04L 5/0053 |
| | | | 370/329 |
| 2018/0110075 A1* | 4/2018 | Ly | H04W 74/0833 |
| 2018/0279375 A1* | 9/2018 | Jeon | H04W 72/23 |
| 2019/0132882 A1* | 5/2019 | Li | H04W 74/0833 |
| 2020/0045650 A1* | 2/2020 | Suzuki | H04W 52/36 |

OTHER PUBLICATIONS

NTT DoCoMo et al: "Discussion on PRACH for eLAA UL", 3GPP Draft; R1-165189, May 14, 2016.

Oppo: "Physical layer design for NR unlicensed", 3GPP Draft; R1-1802124, 3rd Generation Partnership Project (3GPP), Feb. 15, 2018.

Huawei, HiSilicon,R2-164252, "Considerations on leftover issues for RACH," 3GPP TSG-RAN WG2 Meeting #94, May 2016.

CATR,R1-1801903, "Considerations on LBT in NR-based access to unlicensed spectrum," 3GPP TSG RAN WG1 Meeting #92, Mar. 2018.

3GPP TS 38.321 V15.1.020180402https://www.3gpp.org/ftp//Specs/archive/38_series/38.321/38321-f10.zip.

Huawei, HiSiliconHigh level consideration on NR unlicensed band operation[online]3GPP TSG RAN WG1 adhoc_NR_AH_1801 R1-1800038Internet <URL:http://www.3gpp.org/ftp/tsg_ran/WG1_RL1/TSGR1_AH/NR_AH_1801/Docs/R1-1800038.zip>20180113.

ZTE Corporation, ZTE MicroelectronicsOn 2-step RACH procedure in NR[online]3GPP TSG RAN WG1 #87 R1-1611274Internet<URL:http://www.3gpp.org/ftp/tsg_ran/WG1_RL1/TSGR1_87/Docs/R1-1611274.zip>Nov. 5, 2016.

* cited by examiner

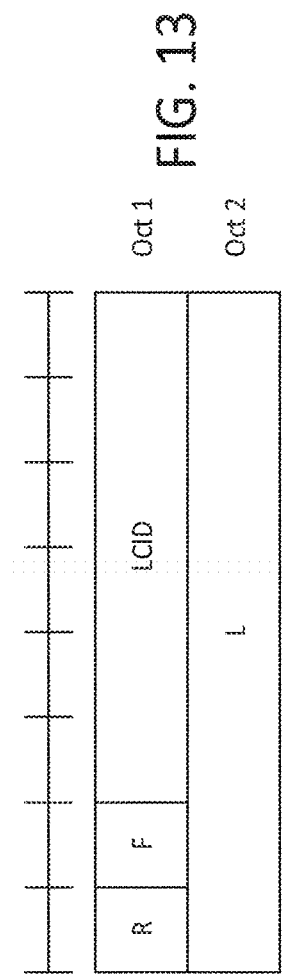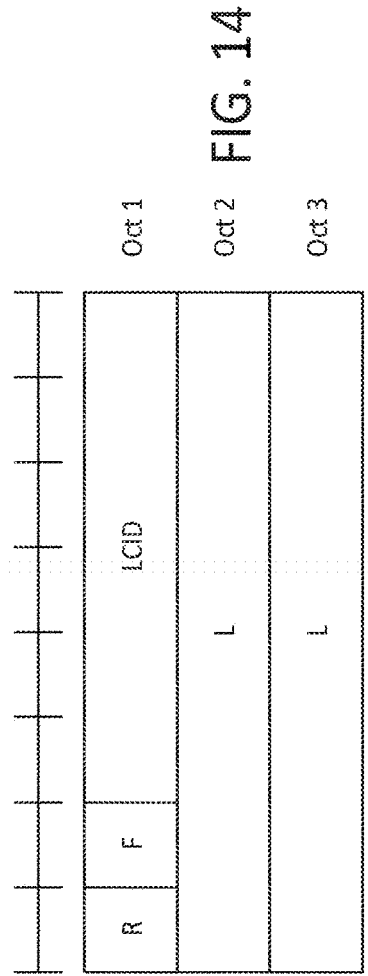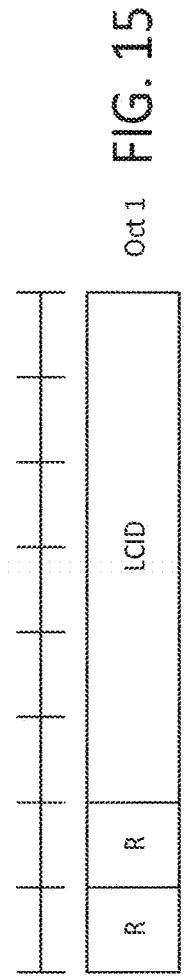

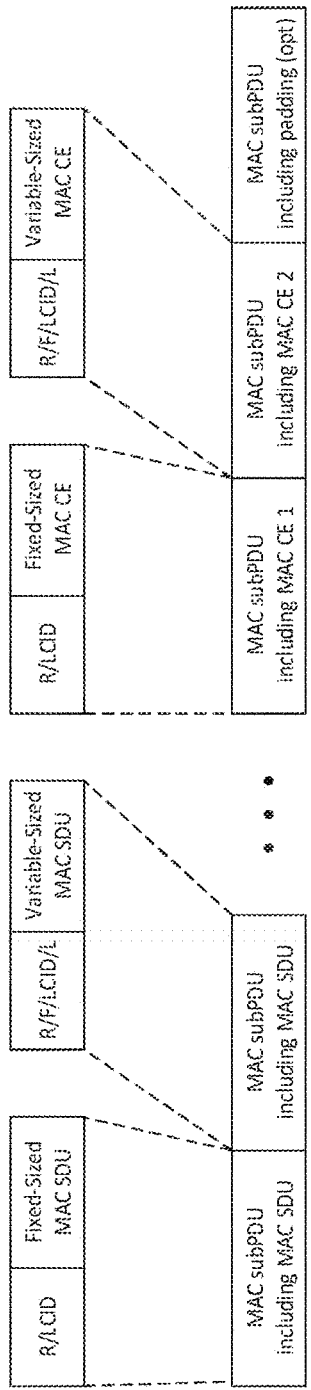
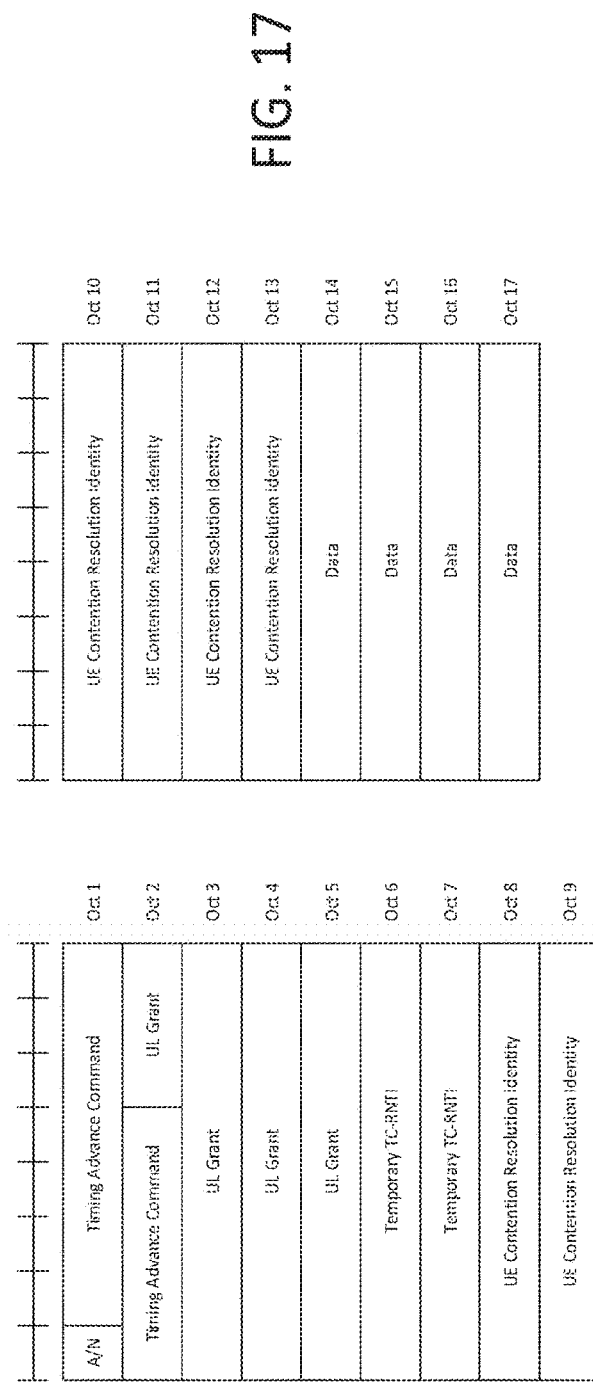
FIG. 16
FIG. 17

RANDOM ACCESS WITH NEW RADIO UNLICENSED CELLS

CROSS-REFERENCE TO RELATED APPLICATIONS

This application is a continuation of U.S. application Ser. No. 17/044,979, filed Oct. 2, 2020, which is the National Stage Application of International Patent Application No. PCT/US2019/025810, filed Apr. 4, 2019, which claims the benefit of U.S. Provisional Patent Application No. 62/652,710, filed on Apr. 4, 2018, entitled "Random Access with New Radio Unlicensed Cells," and the benefit of U.S. Provisional Patent Application No. 62/753,593, filed on Oct. 31, 2018, entitled "Random Access with New Radio Unlicensed Cells," the contents of each application are hereby incorporated by reference herein in their entirety.

BACKGROUND

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells as disclosed in 3GPP TS 36.300, Overall Description; Stage 2 (Release 15), V15.0.0, which is incorporated by reference herein in its entirety.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

Frame structure type 3 is applicable to LAA secondary cell operation with normal cyclic prefix only. Each radio frame is $T_f = 307200 \cdot T_s = 10$ ms long and consists of 20 slots of length $T_{slot} = 15360 \cdot T_s = 0.5$ ms, numbered from 0 to 19. A subframe is defined as two consecutive slots where subframe i consists of slots i and 2i+1 as disclosed in 3GPP TS 36.211, Physical Channels and Modulation (Release 15), V15.0.0, which is incorporated by reference herein in its entirety.

The 10 subframes within a radio frame are available for downlink or uplink transmissions. Downlink transmissions occupy one or more consecutive subframes, starting anywhere within a subframe and ending with the last subframe either fully occupied or following one of the DwPTS durations in as specified in Table 4.2-1 of 3GPP TS 36.211. Uplink transmissions occupy one or more consecutive subframes.

3GPP TR 38.913, Study on Scenarios and Requirements for Next Generation Access Technologies; (Release 14), V14.3.0 defines scenarios and requirements for next generation access technologies. The Key Performance Indicators (KPIs) for eMBB, URLLC and mMTC devices are summarized in Table 1.

TABLE 1

KPIs for eMBB, URLLC and mMTC Devices

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
|  | Mobility interruption time | Mobility interruption time means the shortest time duration supported by the system during which a user terminal cannot exchange user plane packets with any base station during transitions. | 0 ms for intra-system mobility |
|  | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
|  | Control Plane Latency | Control plane latency refers to the time to move from a battery efficient state (e.g., IDLE) to start of continuous data transfer (e.g., ACTIVE). | 10 ms |
| URLLC | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
|  | Reliability | Reliability can be evaluated by the success probability of transmitting X bytes within 1 ms, which is the time it takes to deliver a small data packet from the radio protocol layer 2/3 SDU ingress point to the radio protocol layer 2/3 SDU point of the radio interface, at a certain channel quality (e.g., coverage-edge). | $1-10^{-5}$ within 1 ms |
| mMTC | Coverage | MaxCL in uplink and downlink between device and Base Station site (antenna connector(s)) for a data rate | 164 dB |

TABLE 1-continued

KPIs for eMBB, URLLC and mMTC Devices

| Device | KPI | Description | Requirement |
|---|---|---|---|
| | UE Battery Life | of 160 bps, where the data rate is observed at the egress/ingress point of the radio protocol stack in uplink and downlink. UE battery life can be evaluated by the battery life of the UE without recharge. For mMTC, UE battery life in extreme coverage shall be based on the activity of mobile originated data transfer consisting of 200 bytes UL per day followed by 20 bytes DL from MaxCL of 164 dB, assuming a stored energy capacity of 5 Wh. | 15 years |
| | Connection Density | Connection density refers to total number of devices fulfilling specific Quality of Service (QoS) per unit area (per km²). QoS definition should take into account the amount of data or access request generated within a time t_gen that can be sent or received within a given time, t_sendrx, with x % probability. | $10^6$ devices/km² |

SUMMARY

An exemplary method may perform random access subject to Listen-Before-Talk (LBT) in an NR-U Serving Cell with multiple models where in one model, the behavior of the MAC random access procedure remained unchanged with the impact of LBT on the procedure limited to PHY layer, while in an alternative model, MAC is informed of each instance of failure to transmit random access preamble as the result of LBT so MAC can take the necessary corrective action. Some of the specific proposed ideas include the following enhancements, definitions, and procedures.

Enhancements may be the Random Access Resource Selection procedure to enable selection of PRACHs associated with multiple BWPs or sub-bands. Enhancements may be to the Random Access Preamble Transmission procedure to enable autonomous BWP switching or sub-band in the event the channel is busy for the active UL BWP. There may be definitions of Random Access Preamble (RAP) Transmission Indication that may be used to inform the MAC of a successful preamble transmission attempt and the BWP that was used for the preamble transmission. There may be a procedure to correct the error in the Timing Advance Command due to delays in the preamble transmission caused by LBT.

Exemplary methods may perform 2-step RACH, which may include 1) definition of MAC PDUs to signal MsgA and MsgB; 2) MAC procedures to perform MsgA transmission and MsgB reception; 3) procedures to fallback to the 4-step RACH when the 2-step RACh fails; or 4) a procedure to fall back to scheduled transmissions for completion of the handover procedure when the 2-step RACH fails.

An exemplary method may perform LBT prioritization in support of random access prioritization procedures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 13 illustrates an exemplary R/F/LCID/L MAC Subheader with 8-bit L Field;

FIG. 14 illustrates an exemplary R/F/LCID/L MAC Subheader with 16-bit L Field;

FIG. 15 illustrates an exemplary R/LCID MAC Subheader;

FIG. 16 illustrates an exemplary MsgA MAC PDU;

FIG. 17 illustrates an exemplary MAC RAR Used for MsgB;

FIG. 21 illustrates an exemplary Fallback to 4-Step RACH Procedure;

DETAILED DESCRIPTION

NR Beamformed Access: Disclosed below is a framework for beamformed access based on the understanding that characteristics of the wireless channel at higher frequencies are significantly different from the sub-6 GHz channel that LTE is currently deployed on. A challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming may assist in guaranteeing sufficient signal level at the receiver end.

Relying solely on MIMO digital precoding used by digital beamforming to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

Figure 1:
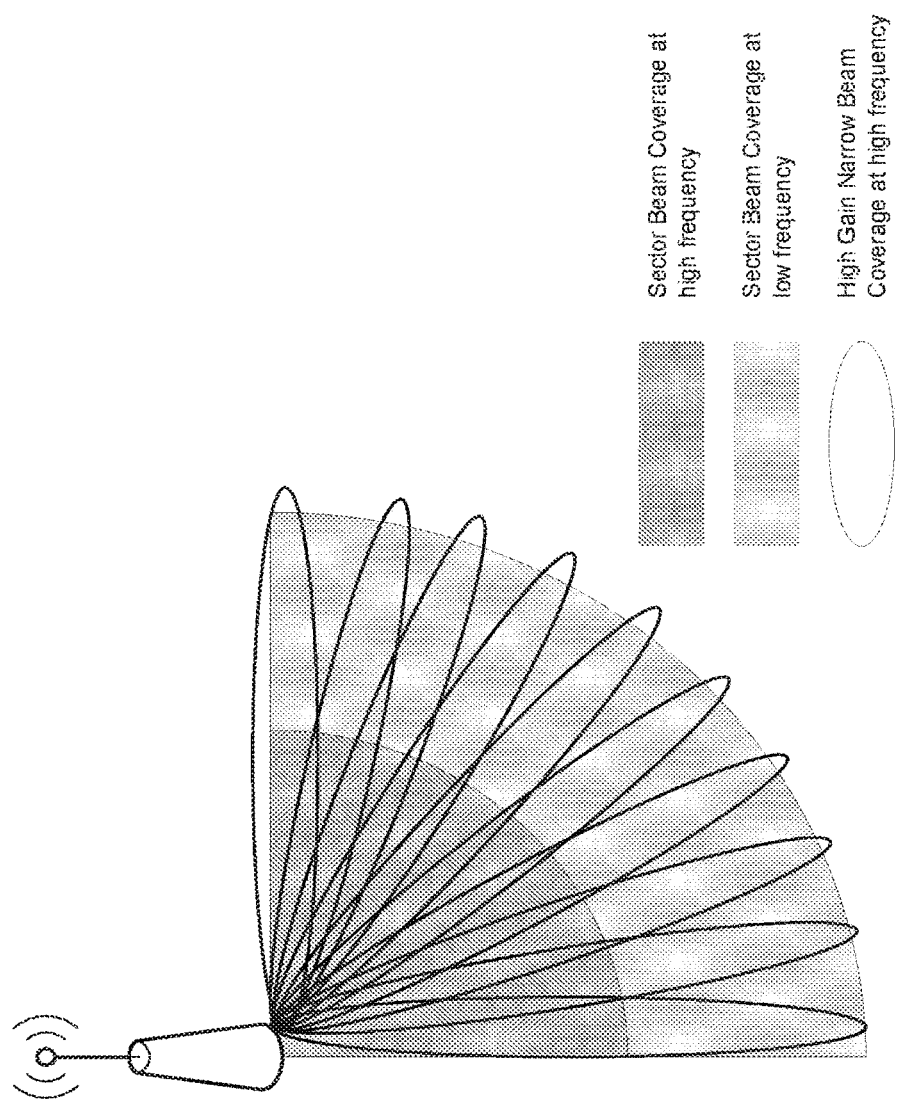
FIG. 1 illustrates an exemplary Cell Coverage with Sector Beams and Multiple High Gain Narrow Beams.

Considering the observations above, multiple transmissions in time domain with narrow coverage beams steered to cover different serving areas may assist in resolving some issues. The analog beam of a subarray may be steered toward a single direction at the time resolution of an OFDM symbol or any appropriate time interval unit defined for the purpose of beam steering across different serving areas within the cell, and hence the number of subarrays may determine the number of beam directions and the corresponding coverage on each OFDM symbol or time interval unit defined for the purpose of beams steering. In some literature, the provision of multiple narrow coverage beams for this purpose has been called "beam sweeping." For analog and hybrid beamforming, the beam sweeping helps provide the basic coverage in NR. This concept is illustrated in FIG. 1 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is used to cover the whole coverage areas within a serving cell in NR.

One concept related to beam sweeping is the concept of beam pairing which is used to select the best beam pair between a UE and its serving cell, which may be used for control signaling or data transmission. For the downlink transmission, a beam pair may include a UE RX beam and NR-Node TX beam, while for uplink transmission, a beam pair may include a UE TX beam and NR-Node RX beam.

Another related concept is the concept of beam training, which may be used for beam refinement. For example, as illustrated in FIG. 1, a coarser sector beamforming may be applied during the beam sweeping and sector beam pairing procedure. A beam training may then follow where for example the antenna weights vector is refined, followed by the pairing of high gain narrow beams between the UE and NR-Node.

NR Random Access Procedure: The random access procedure may be triggered by a number of events, for instance: 1) Initial access from RRC_IDLE; 2) RRC Connection Re-establishment procedure; 3) Handover; 4) DL or UL data arrival during RRC_CONNECTED when UL synchronisation status is "non-synchronised"; 5) Transition from RRC_INACTIVE; 6) Request for Other SI; or 7) Beam failure recovery.

Figure 2:
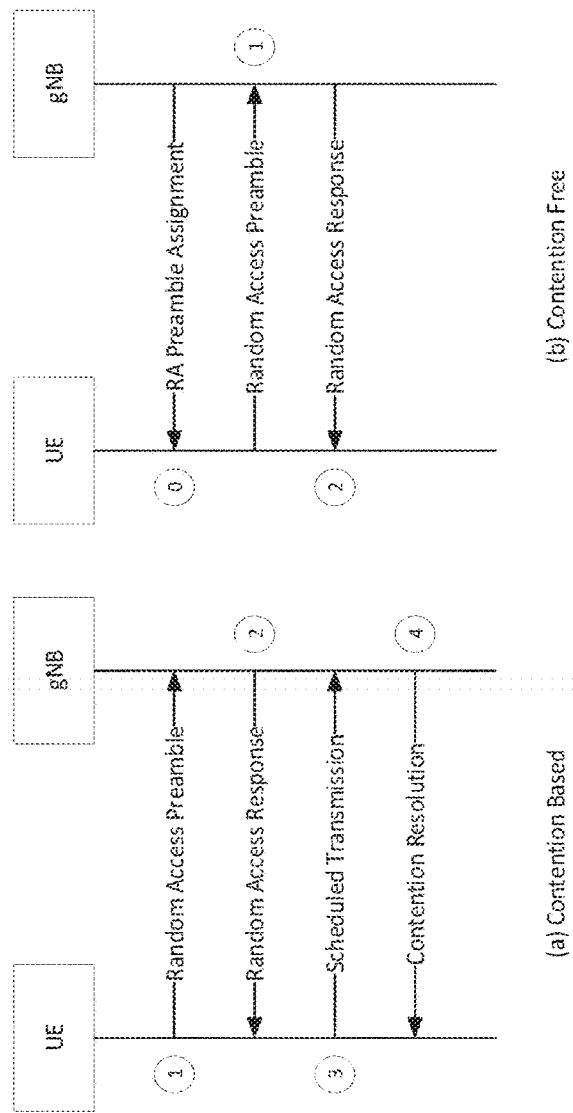
FIG. 2 illustrates an exemplary NR Random Access Procedure.

Furthermore, the random access procedure generally takes two distinct forms: contention based and contention free as shown in FIG. 2. Normal DL/UL transmission can take place after the random access procedure.

For initial access in a cell configured with supplementary uplink (SUL), the UE may the SUL carrier if and only if the measured quality of the DL is lower than a broadcast threshold. Once started, all uplink transmissions of the random access procedure remain on the selected carrier.

Figure 3:
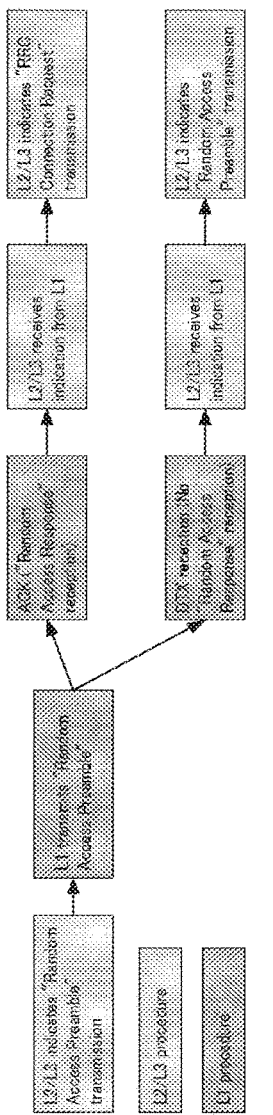
FIG. 3 illustrates an exemplaryInteraction model between L1 and L2/3 for Random Access Procedure.

Random access procedure described above is modelled in FIG. 3 from L1 and L2/L3 interaction point of view. L2/L3 receives indication from L1 whether ACK is received or DTX is detected after indication of Random Access Preamble transmission to L1. L2/3 indicates L1 to transmit first scheduled UL transmission (RRC Connection Request in case of initial access) if necessary or Random Access Preamble based on the indication from L1.

With Bandwidth Adaptation (BA), the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP) and BA is achieved by configuring the UE with BWP(s) and telling the UE which of the configured BWPs is currently the active one.

Figure 4:
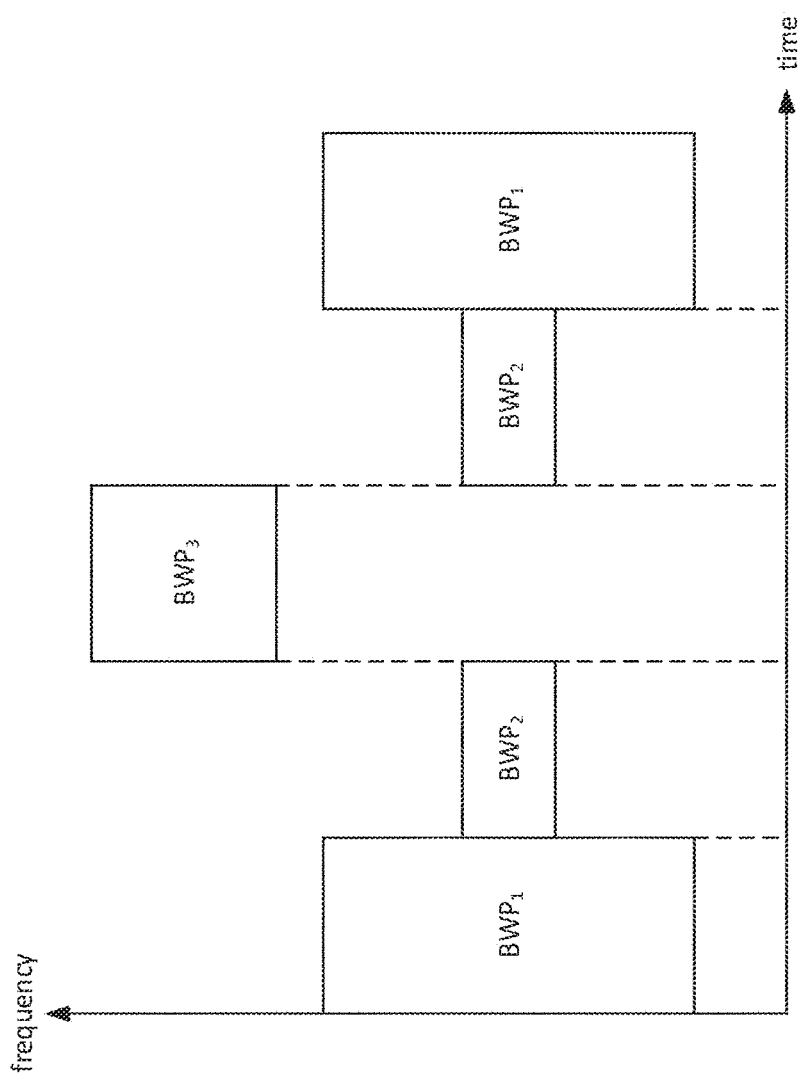
FIG. 4 illustrates an exemplary BA.

FIG. 4 describes a scenario where 3 different BWPs are configured: 1) BWP1 with a width of 40 MHz and subcarrier spacing of 15 kHz; 2) BWP2 with a width of 10 MHz and subcarrier spacing of 15 kHz; and 3) BWP3 with a width of 20 MHz and subcarrier spacing of 60 kHz.

A Serving Cell may be configured with four BWPs, and for an activated Serving Cell, there is one active BWP at any point in time. The BWP switching for a Serving Cell is used to activate an inactive BWP and deactivate an active BWP at a time, and is controlled by the PDCCH indicating a downlink assignment or an uplink grant. Upon addition of SpCell (Special Cell) or activation of an SCell, one BWP is initially active without receiving PDCCH indicating a downlink assignment or an uplink grant. The active BWP for a Serving Cell is indicated by RRC or PDCCH. For unpaired spectrum, a DL BWP is paired with a UL BWP, and BWP switching is common for UL or DL.

With reference to a first issue, for LTE, when performing UL transmission with a license assisted access (LAA) SCell, the MAC entity considers a transmission to have been performed regardless of the LBT result as disclosed in 3GPP TS 36.321, Medium Access Control (MAC) protocol specification (Release 15), V15.0.0, which is incorporated by reference in its entirety. For LTE, Random Access was not expected to be performed with an LAA SCell, so enhancements to mitigate the effects of this behavior on the Random Access procedure weren't required.

For NR-U, Random Access is expected to be performed with NR-U SCells (carrier aggregation—CA—deployments), NR-U PSCells (duel connectivity—DC—deployments) and NR-U PCells (standalone—SA—deployments). If the LTE approach for UL transmission with an LAA SCell is applied when performing random access in an NR-U Serving Cell, then if LBT fails for Msg1 transmission, the UE will wait until the ra-ResponseWindow expires before attempting a retransmission. Similarly, if LBT fails for Msg3, the transmission of Msg3 may be delayed and may even lead to the failure of the random access procedure. To reduce the latency when performing random access procedure in an NR-U cell, solutions to avoid unnecessary random access delay as a result of LBT should be considered.

With reference to a second issue, the NR random access procedure might be triggered by a number of events as described herein in 3GPP TS 38.300, NR; NR and NG-RAN Overall Description; Stage 2 (Release 15), V15.0.0, which is incorporated by reference in its entirety. Prioritized random access procedure may be incorporated into NR Phase 1, for example for the case of handovers using contention-based access, or for the case of Beam Failure Recovery (BFR) procedure. Considering that listen-before-talk (LBT) failure may cause the failure of random access or cause delay in a successful completion of the random access procedure, further enhancements to prioritized random access in presence of LBT should be considered.

Disclosed herein are multiple techniques to address the aforementioned two issues, among other issues. A first technique may be associated with a method to perform random access subject to LBT in an NR-U Serving Cell with multiple solution models. In one model, the behavior of the MAC random access procedure remained unchanged with the impact of LBT on the procedure limited to PHY layer, while in an alternative model, MAC is informed of each instance of failure to transmit random access preamble as the result of LBT, so MAC can take the necessary corrective action. Some of the specific disclosed approaches for the method to perform random access subject to LBT may include the following four approaches. A first approach includes enhancements to the random access resource selection procedure to enable selection of PRACHs associated with multiple BWPs or sub-bands. A second approach includes enhancements to the random access preamble transmission procedure to enable autonomous BWP switching or sub-band in the event the channel is "busy" for the active UL BWP. A third approach includes definition of random access preamble (RAP) transmission indication that may be used to inform the MAC of a successful preamble transmission attempt and the BWP that was used for the preamble transmission. A fourth approach includes a procedure to correct the error in the timing advance command due to delays in the preamble transmission caused by LBT.

A second technique may include methods that perform 2-step RACH, which may include 1) definition of MAC PDUs to signal MsgA and MsgB; 2) MAC procedures to perform MsgA transmission and MsgB reception; 3) procedures to fallback to the 4-step RACH when the 2-step RACh fails; or 4) a procedure to fall back to scheduled transmissions for completion of the handover procedure when the 2-step RACH fails. A third technique may include a method to perform LBT prioritization in support of random access prioritization procedures.

An NR-U Serving Cell may be configured as an SCell, PSCell, or PCell depending on the deployment scenario. For Carrier Aggregation (CA) between a licensed band NR (PCell) and NR-U (SCell), Random Access may be performed with the NR-U SCell for the following events: 1) To establish time alignment with an NR-U SCell; or 2) Beam Failure Recovery.

For Dual Connectivity (DC) between licensed band LTE (PCell) and NR-U (PSCell), Random Access may be performed with the NR-U PSCell for the following events: 1) CG addition/modification; 2) UL/DL data arrival when UL is "non-synchronized" or there are no PUCCH resources; or 3) Beam Failure Recovery. For UL/DL data arrival, DL data arrival may trigger RACH on NR-U PSCell or NR-U SCell of SCG when UL is "not synchronized" and UL data arrival may trigger RACH on NR-U PSCell when UL is "not synchronized" or there are no PUCCH resources.

For Stand-Alone (SA) NR-U, Random Access may be performed with an NR-U SA cell for the following events: 1) Initial access; 2) RRC Connection Re-establishment; 3) Handover; 4) UL/DL data arrival when the UL is "non-synchronized" or there are no PUCCH resources; 5) Transition from RRC_INACTIVE; 6) Request for Other SI; or 7) Beam Failure Recovery.

Techniques are described that may address the problems described herein that are associated with performing random access with an NR-U Serving Cell. The techniques are contemplated for use with the events triggering a random access procedure described herein. Some of these techniques are exemplified using a specific triggering event, e.g. reception of a PDCCH order. However, this does not preclude the techniques from being used with other events triggering a random access procedure described herein.

Figure 5:
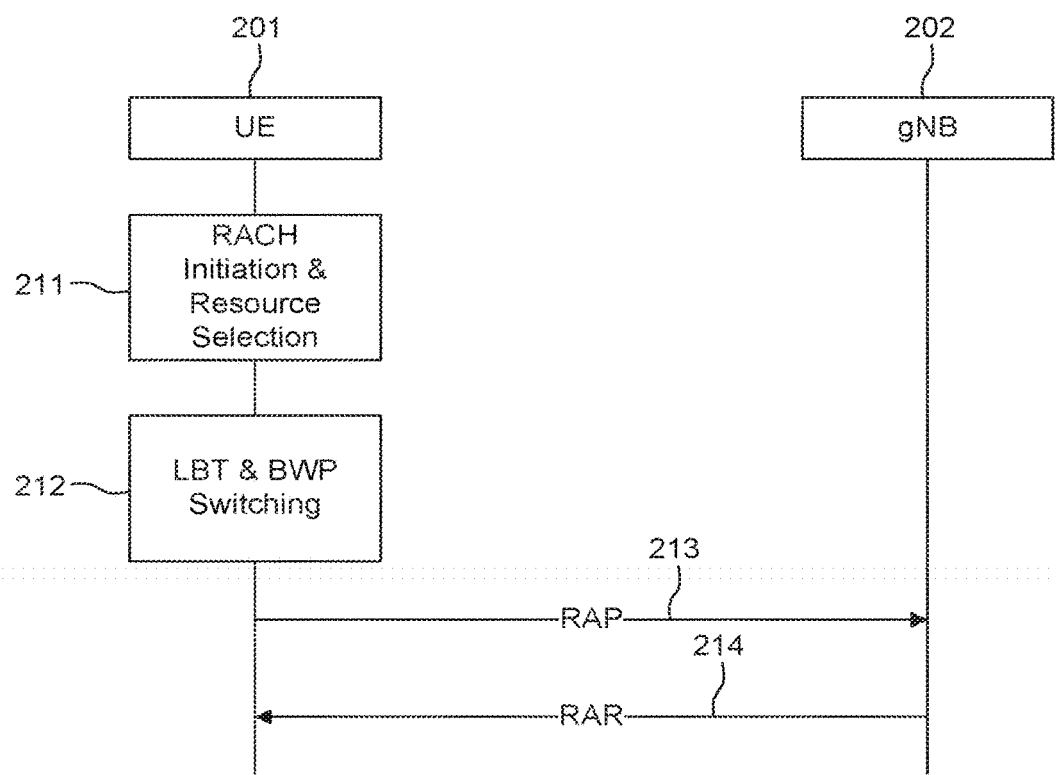
FIG. 5 illustrates an exemplary Random Access with an NR-U Serving Cell Using Sub-Band LBT and BWP Switching.

FIG. 5 is an illustration of the signaling that may be used to perform Random Access in an NR-U Serving Cell using sub-band LBT and BWP switching. At step 211, the Random Access procedure is initiated at UE 201 and UE 201 may perform Random Access Resource selection. At step 212, UE 201 performs LBT sub-band LBT and BWP switching (if necessary) prior to the preamble transmission. At step 213, if the channel for at least one of the UL BWPs is "free" (e.g., determined that the channel was not occupied by other devices), the random access preamble (RAP) is transmitted to gNB 202. At step 214, if the preamble was transmitted in step 213, UE 201 monitors the PDCCH for the random access response (RAR) and may subsequently obtain it (e.g., sent by gNB 202).

When performing the Random Access procedure described in FIG. 5, UE 201 may be configured with one or more BWPs for the NR-U Serving Cell, where one of the configured BWPs is active at a given time.

BWP switching may be performed upon initiation of the Random Access procedure with an NR-U Serving Cell to activate an inactive BWP and deactivate an active BWP. The BWP switching may be controlled using a PDCCH order or RRC signaling. BWP switching may also be performed autonomously by UE 201 upon initiation of the Random Access procedure if PRACH resources are not configured for the active UL BWP, in which case UE 201 switches to the initial BWP.

An LBT procedure may be performed on the active UL BWP prior to the preamble transmission. If the LBT procedure indicates the channel is "free", UE 201 may commence with the preamble transmission on the active UL BWP. If the LBT procedure indicates the channel is "busy" for the active UL BWP, BWP switching may be performed autonomously by UE 201.

How the BWP switching is performed may be controlled by a specified rule. For example, UE 201 may autonomously switch to the default BWP, if configured, provided the active BWP is not the default BWP and the default BWP is configured with PRACH resources. If the default BWP is not configured or if it is configured without PRACH resources, UE 201 may autonomously switch to the initial BWP, provided the active BWP is not the initial BWP.

After switching the BWP, an LBT procedure may be performed on the active UL BWP (e.g., default UL BWP or initial UL BWP) prior to the preamble transmission. If the LBT procedure indicates the channel is "free", UE 201 may commence with the preamble transmission on the active UL BWP. If the LBT procedure indicates the channel is "busy", UE 201 may cease with attempting to perform the preamble transmission for the current PRACH occasion. Depending on the capabilities of UE 201, the LBT procedures performed on the UL BWPs may be done sequentially or simultaneously.

Alternative rules, where the BWP may be autonomously switched multiple times during a PRACH occasion, may also be defined. For example, a first preamble transmission attempt may be made on the active UL BWP. If LBT indicates the channel is "busy", the BWP is switched to the default BWP, where another attempt is made. If LBT indicates the channel is "busy" on the default UL BWP, the BWP is switched to the initial BWP, where a final attempt is made.

In another example, UE 201 may select the BWP to autonomously switch to, where the selected BWP is from the set of inactive BWPs configured with PRACH resources; and if attempts on such BWPs fail, UE 201 may make a final attempt on the initial BWP. Alternatively, the set of BWPs to select from may be signaled to UE 201 (e.g., a PDCCH order may be used to indicate which of the configured BWPs UE 201 may autonomously switch to). Autonomously switching may be considered switching without being instructed by a remote network device.

And in yet another example, how the BWP switching is performed may be left to UE implementation, but the maximum number of BWP switches that are performed may be controlled by a counter whose value may be signaled to UE 201 via higher layer signaling or specified in the standards.

Figure 6:
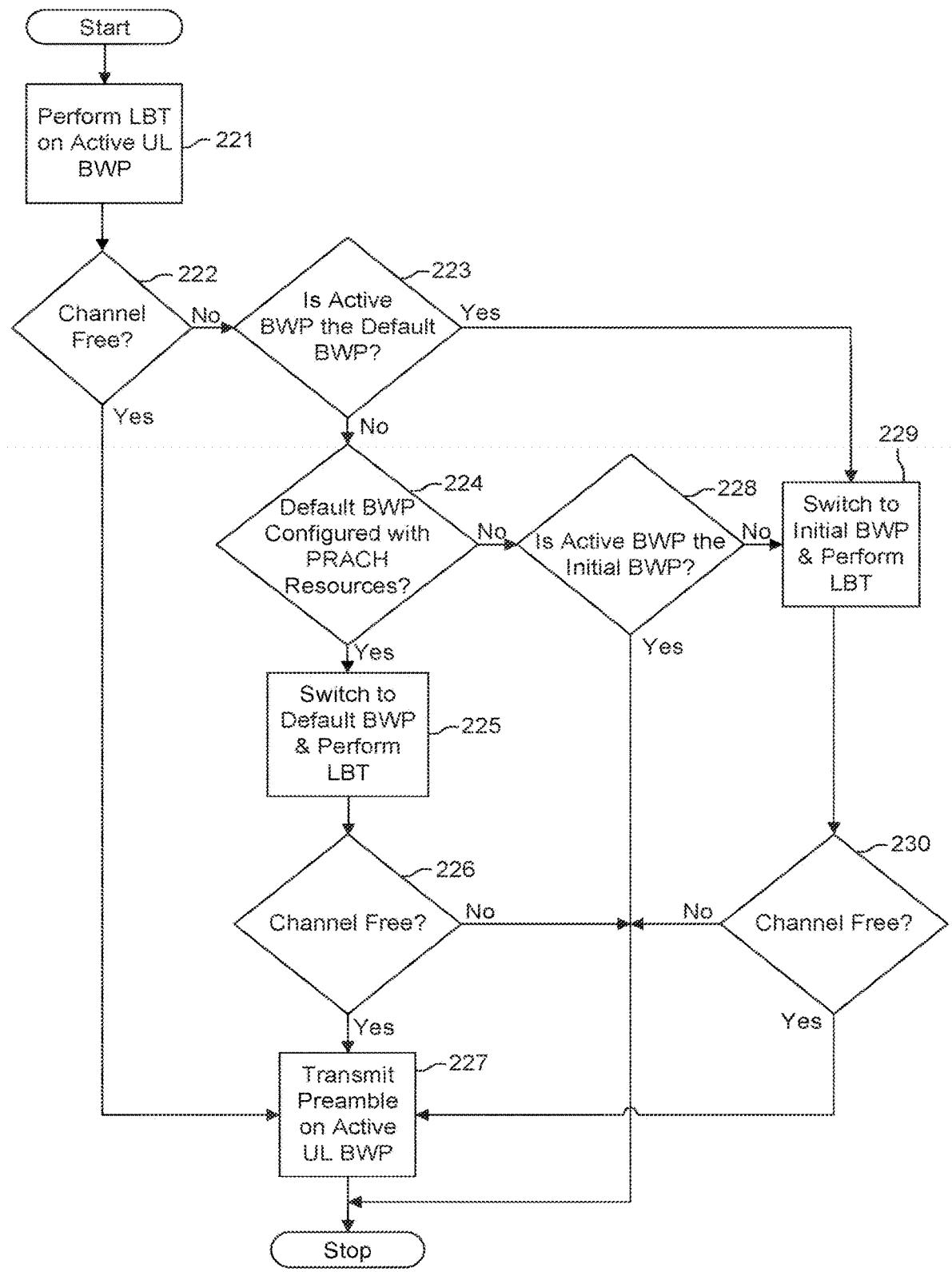
FIG. 6 illustrates an exemplary Algorithm where UE Performs Sub-Band LBT on UL BWPs Sequentially.

FIG. 6 is an exemplary illustration of a rule-based algorithm where the preamble transmission may be attempted on up to 2 BWPs. The first attempt is on the active UL BWP, followed by a second attempt on the default or initial UL BWP. In this example, UE 201 performs sub-band LBT on the UL BWPs sequentially. With reference to FIG. 6, at step 221, LBT may be performed on active UL BWP. At step 222, if it is determined that channel is free then proceed to step 227 in order to transmit the preamble on active UL BWP. If it is determined that the channel is not free, then there may be a further determination at step 223 of whether the active BWP is the default BWP. If not the default BWP then, proceeding to step 224, there is an additional determination if the default BWP is configured with PRACH resources. If configured with PRACH resources, then at step 225 there is a switch to default BWP and LBT is performed. If the channel is free at step 226, then proceed to step 227 in order to transmit the preamble on active UL BWP. Note, at step 224, if not configured with PRACH resources, then there is an additional determination at step 228 if the active BWP is the initial BWP.

With continued reference to FIG. 6, at step 223, if is determined that the active BWP is the default BWP, then proceed to step 229, in order to switch to initial BWP and perform LBT. And if the channel is free, then proceed to step 227 in order to transmit the preamble on active UL BWP.

Figure 7:
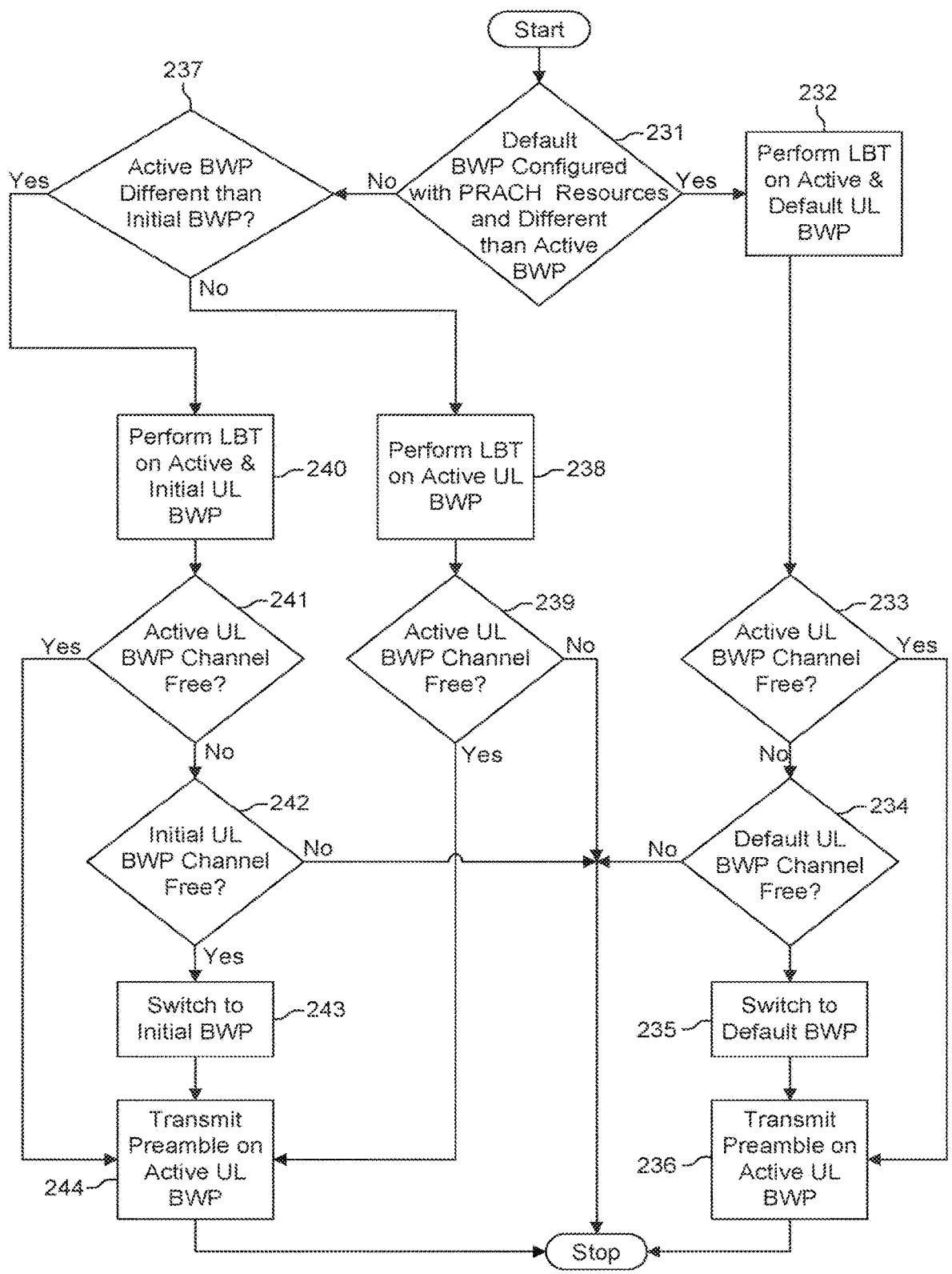
FIG. 7 illustrates an exemplary Algorithm where UE Performs Sub-Band LBT on UL BWPs Simultaneously.

FIG. 7 is an illustration of a similar algorithm, where UE 201 performs sub-band LBT on the UL BWPs simultaneously (e.g., substantially at the same time).

The following Table 2 provides example pseudo code for Random Access Resource selection by a UE for a rule-based BWP switching algorithm such as the one described in FIG. 6:

TABLE 2

The UE should:
- 1> Perform LBT on the active UL BWP; (step 221)
- 1> if the channel is "free": (step 222)
  - 2> transmit the preamble on the active UL BWP. (step 227)
- 1> else if the active BWP is not the default BWP; (step 222) and
- 1> if the default BWP is configured with PRACH resources(step 223):
  - 2> switch to the default BWP and perform LBT(step 225); (Note: After BWP switching, the active BWP corresponds to the default BWP)
  - 2> if the channel is free (step 226):
    - 3> transmit the preamble on the active UL BWP. (step 227)
- 1> else if the active BWP is not the initial BWP: (step 228)
  - 2> switch to the initial BWP and perform LBT (step 229); (Note: After BWP switching, the active BWP corresponds to the initial BWP)
  - 2> if the channel is free: (step 230)
    - 3> transmit the preamble on the active UL BWP. (step 227)

The following Table 2 provides example pseudo code for Random Access Resource selection for a rule-based BWP switching algorithm such as the one described in FIG. 7:

TABLE 3

```
The UE should:
1>  If the default BWP is configured with PRACH resources and is not the same as the
    active BWP: (step 231)
    2>  perform LBT on the active UL BWP and default UL BWP; (step 232)
    2>  if the active UL BWP channel is "free": (step 233)
        2>  transmit the preamble on the active UL BWP. (step 236)
    2>  else if the default UL BWP is free; (step 234)
        2>  switch to the default BWP (step 235); (Note: After BWP switching, the active
            BWP corresponds to the default BWP)
        2>  transmit the preamble on the active UL BWP. (step 236)
1>  else if the active BWP is not the same as the initial BWP: (step 237)
    2>  perform LBT on the active UL BWP and the initial UL BWP; (step 240)
    2>  if the active UL BWP channel is "free": (step 241)
        2>  transmit the preamble on the active UL BWP. (step 244)
    2>  else if the initial UL BWP is free; (step 242)
        2>  switch to the initial BWP (step 243); (Note: After BWP switching, the active
            BWP corresponds to the initial BWP)
        2>  transmit the preamble on the active UL BWP. (step 244)
1>  else: (Note: In this case the active BWP is the same as the initial BWP)
    2>  perform LBT on the active UL BWP; (step 238)
    2>  if the active UL BWP channel is "free": (step 239)
        2>  transmit the preamble on the active UL BWP. (step 244)
```

Figure 8:
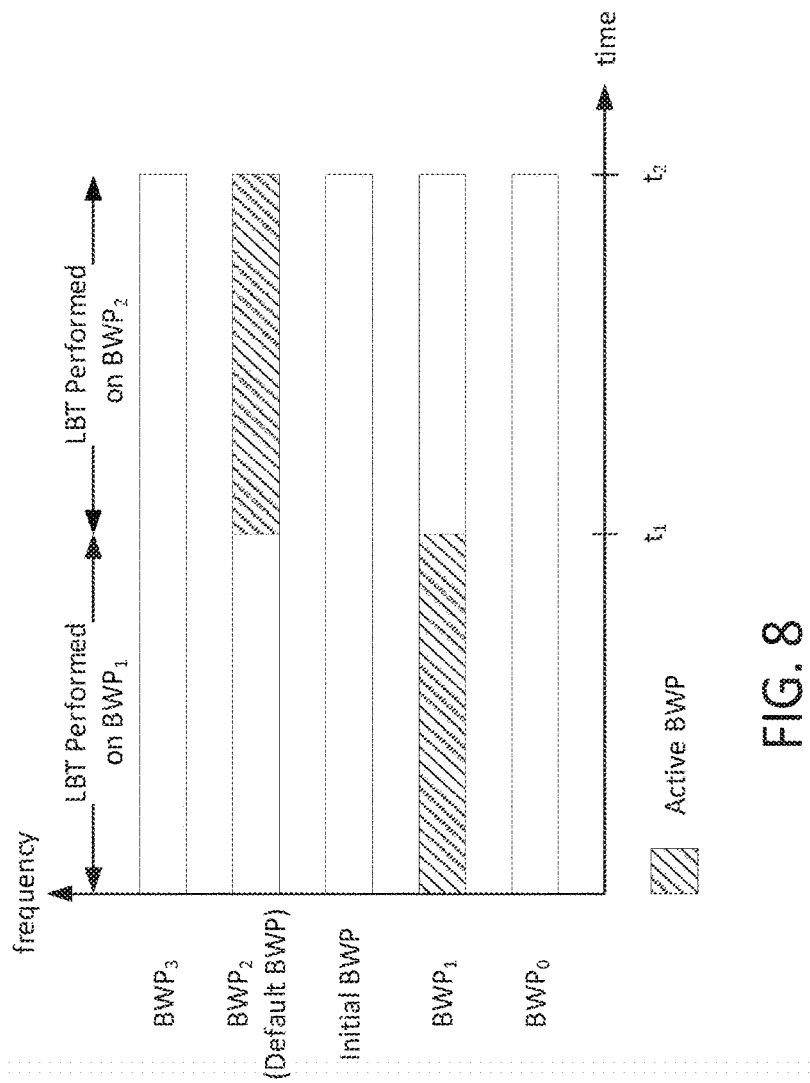
FIG. 8 illustrates an exemplary Timing of BWP Switching with Sub-Band LBT on Multiple BWPs Sequentially.

FIG. 8 is an illustration of the timing of the BWP switching for the algorithm described in FIG. 6, where UE 201 performs sub-band LBT on multiple UL BWPs sequentially. In this example, the NR-U Serving Cell is configured with 4 BWPs. $BWP_1$ is the active BWP when the Random Access procedure is initiated and $BWP_2$ is the default BWP, which is configured with PRACH resources. LBT is performed on $BWP_1$ (the active BWP), which indicates the channel is "busy". At time $t_1$, UE 201 autonomously switches to $BWP_2$ (the default BWP), and performs LBT, which indicates the channel is "free". At time $t_2$, UE 201 commences with the preamble transmission on the active BWP; i.e. $BWP_2$.

Figure 9:
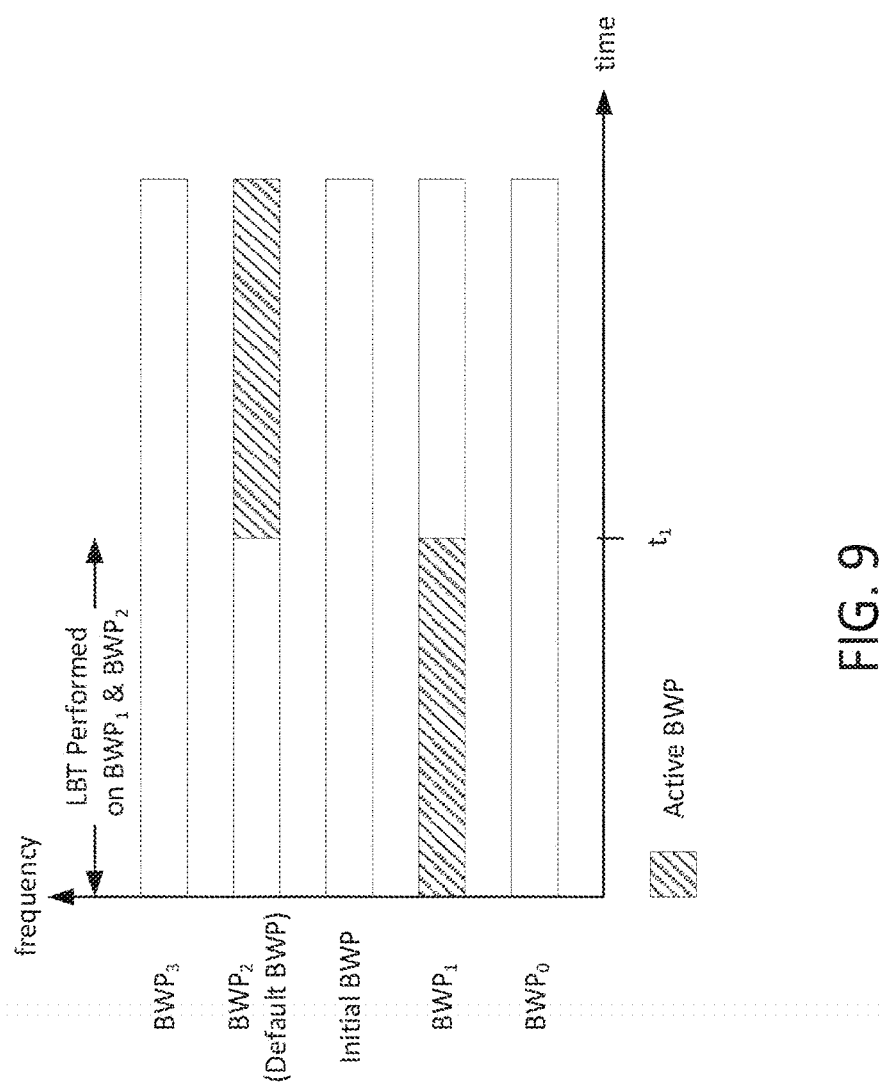
FIG. 9 illustrates an exemplary Timing of BWP Switching with Sub-Band LBT on Multiple BWPs Simultaneously.

FIG. 9 is an illustration of the timing of the BWP switching for the algorithm described in FIG. 7, where UE 201 performs sub-band LBT on multiple UL BWPs simultaneously. In this example, the NR-U Serving Cell is configured with 4 BWPs. $BWP_1$ is the active BWP when the Random Access procedure is initiated and $BWP_2$ is the default BWP, which is configured with PRACH resources. LBT is simultaneously performed on $BWP_1$ (the active BWP) and $BWP_2$ (the default BWP). The LBT procedure performed on $BWP_1$ indicates the channel is "busy" and the LBT procedure performed on $BWP_2$ indicates the channel is "free". At time $t_1$, UE 201 autonomously switches the active BWP to $BWP_2$ and commences with the preamble transmission.

Techniques used for problem statement 1 (i.e., the first issue disclosed above) in terms of UE behavior in MAC layer and UE behavior in PHY layer and interactions between the MAC layer and PHY layer may be further modeled as per the multiple models described below.

A method may perform random access subject to Listen-Before-Talk (LBT) in an NR-U Serving Cell using multiple models, as disclosed herein. In a first model, the behavior of the MAC random access procedure remains unchanged with the impact of LBT on the procedure limited to PHY layer. In a second model, MAC is informed of each instance of failure to transmit random access preamble as the result of LBT so MAC can take the necessary corrective action.

With reference to the first model, the MAC is informed of each instance of failure to transmit random access preamble as the result of LBT, so MAC can take the necessary corrective action. This family of techniques may be considered, in summary, as follows: MAC transmits MSG1 or MSG3 of the random access procedure to PHY. For each instance of failure to transmit MSG1 or MSG3, PHY may inform MAC of the failure instance so MAC can take necessary action such as re-initiating the retransmission of the message with different LBT parameters, such as channel access priority class including corresponding access parameters, the energy detection threshold, etc. Parameters such as frequency sub-bands or BWP that should be used for MSG1 or MSG3 transmission may also be provided to the PHY.

With reference to the second model, this family of techniques may be considered, in summary, as follows: PHY is configured (by RRC or MAC) with multiple set of LBT parameters (e.g. frequency sub-band, BWP, channel access priority class, or the corresponding channel access parameters). PHY informs MAC of the failure to transmit random access message (Msg1 or Msg3) as a result of channel busy outcome from LBT procedure, not on per LBT instance but after PHY performs one or more LBT attempts based on LBT configuration parameters configured to PHY and concluded that LBT procedure has failed. In this case, MAC may treat LBT failure as the normal failure of the procedure that triggered the LBT (in this case random access procedure) and inform the RRC layer accordingly.

To support this second model, the PHY or MAC may be configured with more than one BWP/sub-band (e.g., RACH-default or RACH primary BWP/sub-band, then some other RACH secondary BWP/sub-band, or BWPs/sub-bands are assigned a priority order). MAC may provide to PHY, the list of BWPs/sub-bands to be used for random access procedure, for e.g. if PHY is not already configured with such a list. Note a BWP may be comprised of multiple sub-bands. The subject matter disclosed herein proposed for different BWPs can also be applied for sub-bands within the same BWP.

Upon triggering random access from MAC, the PHY may perform LBT on BWPs/sub-bands in decreasing order of priority of the BWPs/sub-bands. Priority order could be such as the primary or default RACH-BWP/sub-band is the highest priority BWP/sub-band used to perform random access procedure. LBT is considered successful when LBT is successful on one of the BWPs/sub-band configured to PHY. The PHY then transmits MSG1 (or Msg3) on the BWP/sub-band on which a successful LBT has been performed.

Alternatively, the PHY may perform LBT on more than one BWP/sub-band. The PHY then selects one BWP/sub-band among the BWPs/sub-bands with successful LBT (e.g., channel not busy) to perform RACH, where the criteria used for selecting the BWP/sub-band for RACH procedure may be based on the following: 1) Lowest CBR (Channel Busy Ratio); 2) Lowest channel occupancy ratio; 3) BWP/sub-band with the highest number of configured dedicated RACH resources; or 4) BWP/sub-band with the highest number of configured common RACH resources. The PHY then transmits MSG1 on the selected BWP/sub-band among the BWPs/sub-bands on which a successful LBT has been performed.

And in yet another alternative, the PHY may perform LBT on more than one BWP/sub-band and then select more than one BWP/sub-band among the BWPs/sub-bands with successful LBT to perform random access procedure. The number of selected BWPs/sub-bands may be configuration dependent and may be configured to the PHY or MAC. The PHY then transmits MSG1 (or Msg3) on the selected BWPs/sub-bands without waiting for the RAR on the BWPs/sub-bands.

Figure 10:
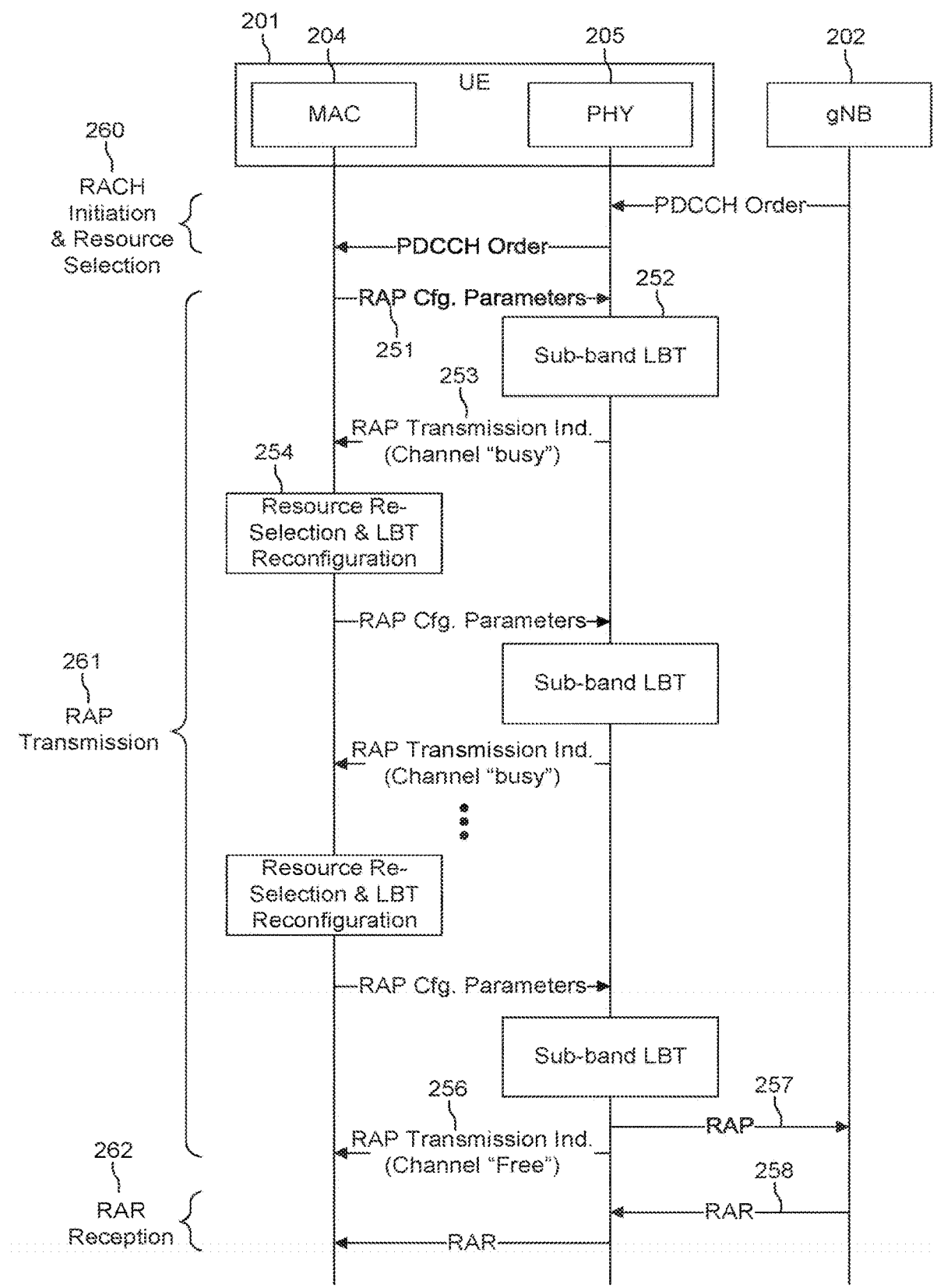
FIG. 10 illustrates an exemplary Model 1 Solution for Random Access with an NR-U Serving Cell Using Sub-Band LBT and BWP Switching.

Disclosed below are methods to perform random access in an NR-U serving cell using sub-band LBT and BWP switching in association with the first model (e.g., Model 1). FIG. 10 is an example illustration of the signaling for a technique based on Model 1 that may be used to perform Random Access with an NR-U Serving Cell using sub-band LBT and BWP switching, where the Random Access procedure is initiated by the network via a PDCCH order. The signaling for Model 1 may be summarized as RACH initiation and resource selection (step 260), RAP transmission (step 261), and RAR reception (step 262). At step 260, the Random Access procedure is initiated (e.g., based on obtaining the PDCCH) at UE 201 and UE 201 performs Random Access Resource selection. At step 251, MAC 204 entity provides PHY 205 with a set of parameters to configure the preamble transmission. Parameters, such as preamble index, selected PRACH resource and BWP, LBT parameters, etc. At step 252, PHY 205 may then perform sub-band LBT on the selected BWP. If the channel is "busy", at step 253, a RAP Transmission Indication may be sent to inform the MAC of the failure to transmit the preamble. At step 254, MAC 204 may then perform Random Access Resource selection using a different BWP and the process is repeated. When the channel is "free," at step 256, the preamble is transmitted (step 257) and a RAP Transmission Indication may be sent to inform MAC 204 that the preamble was transmitted. When the preamble is transmitted, UE 201 may monitor the PDCCH for the RAR (e.g., step 258).

Disclosed below are methods to perform random access in an NR-U serving cell using sub-band LBT and BWP switching in association with the second model (e.g., Model 2). FIG. 11 is an illustration of the signaling for a technique based on Model 2 that may be used to perform Random Access with an NR-U Serving Cell using sub-band LBT and BWP switching, where the Random Access procedure is initiated by the network via a PDCCH order.

Figure 11A:
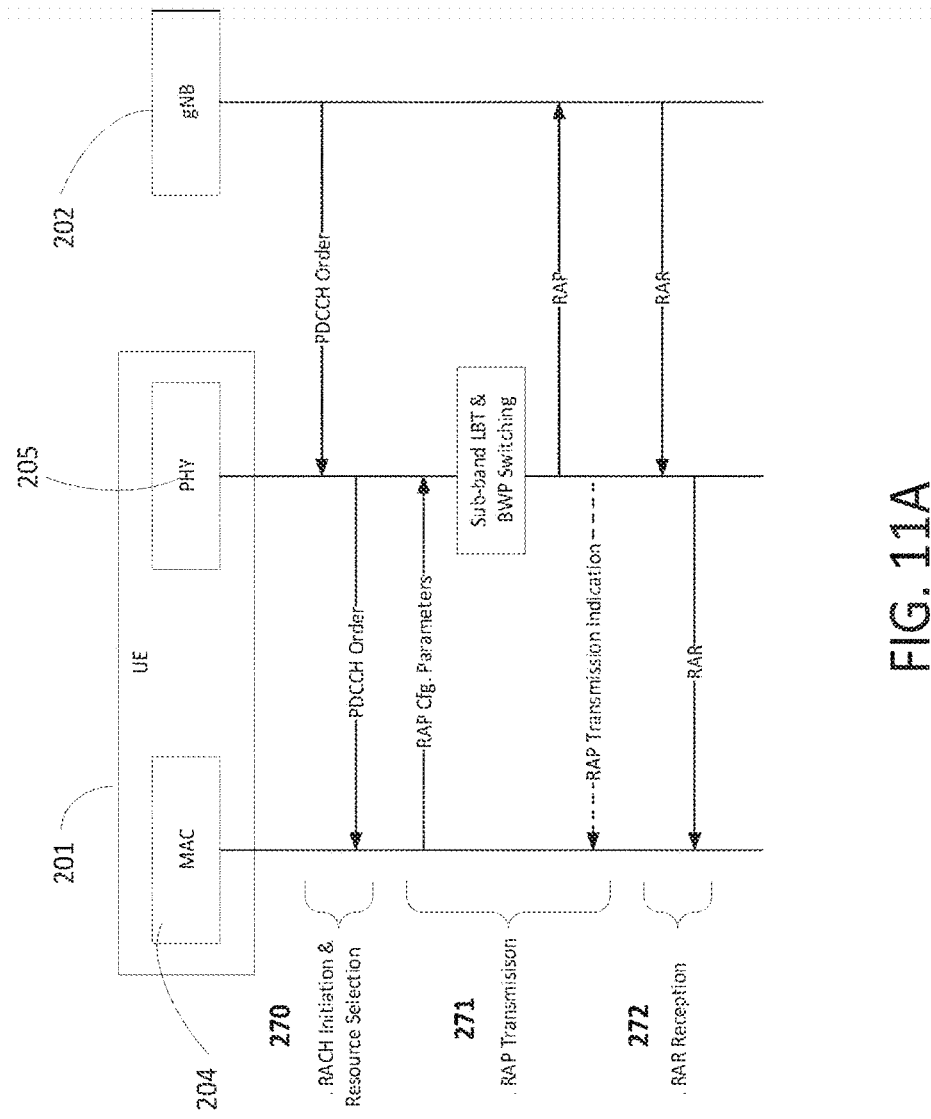
FIG. 11A illustrates an exemplary Model 2 Solution for Random Access with an NR-U Serving Cell Using Sub-Band LBT and BWP Switching.
Figure 11B:
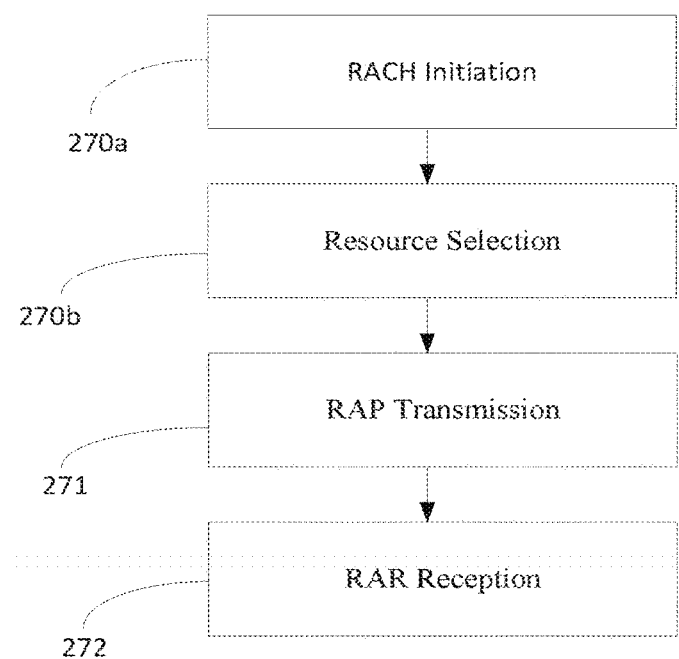
FIG. 11B provides another depiction of the scenario of FIG. 11A.

In the scenario described in FIG. 11A, if the random access response window timer expires, the MAC may inform the RRC (not shown) of the failure of the random access procedure. FIG. 11B provides another depiction of the same scenario of FIG. 11A. The signaling for Model 2 may be summarized as RACH initiation (step 270a) and resource selection (step 270b), RAP transmission (step 271), and RAR reception (step 272). More details are provided herein.

The following UE variables may be used when performing the Random Access procedure: 1) PREAMBLE_INDEX; 2) PREAMBLE_TRANSMISSION_COUNTER; 3) PREAMBLE_POWER_RAMPING_COUNTER; 4) PREAMBLE_RECEIVED_TARGET_POWER; 5) PREAMBLE_BACKOFF; 6) PCMAX; or 7) TEMPORARY_C-RNTI. These UE variables are typically configured in step 270 and may be used by PHY 205 in step 271. The counters may not be incremented until step 271 since MAC 204 usually waits for confirmation form PHY 205 that the preamble was transmitted.

With reference to RACH initiation of step 270a, UE 201 receives a PDCCH order that initiates a Random Access procedure. gNB 202 may transmit PDCCH order so the UE 202 may establish time alignment with an NR-U Serving Cell, where the NR-U Serving Cell may be configured as an SCell, PSCell, or PCell, depending on the deployment scenario. The PDCCH order may include one or more of the following parameters: 1) Preamble Index; 2) PRACH Mask Index; or 3) BWP Switch Command. If the PDCCH order may include a BWP Switch Command, in which the BWP is switched in accordance with the command. MAC entity 204 may initialize the UE variables as follows: 1) PREAMBLE_TRANSMISSION_COUNTER is set to 1; 2) PREAMBLE_POWER_RAMPING_COUNTER is set to 1; 3) PREAMBLE_BACKOFF I set to 0 ms; 4) PCMAX is set to the value to $P_{CMAX,c}$ provided by higher layers; e.g. RRC signaling; 5) PREAMBLE_INDEX is set to the value of the Preamble Index signaled in the PDCCH order; or 6) PRACH_MASK_INDEX is set to the value of the PRACH Mask Index signaled in the PDCCH order. The aforementioned PDCCH order may apply to other PDCCH orders (e.g., step 26 of FIG. 10 or step 270 of FIG. 11).

With reference to Resource Selection of step 270b, MAC entity 204 may perform Random Access Resource selection. To enable autonomous BWP switching in the event the channel is "busy" for the active UL BWP, MAC 204 may select PRACHs associated with multiple BWPs, where the multiple BWPs may include the active BWP, the default BWP, the initial BWP, or the configured inactive BWPs. The selected resources may be provided to PHY 205 in an ordered list; e.g. ordered according to the associated BWP.

The following example pseudo code in Table 4 is for Random Access Resource selection for a rule-based BWP switching algorithm such as the one described in FIG. 6 or FIG. 7. The text in Table 4 may be a procedural description of the behavior described with regard to 270b.

TABLE 4

The MAC entity 204 should:
1> select an SSB for the active BWP with SS-RSRP above the rsrp-ThresholdSSB;
1> if none of the SS blocks are above the rsrp-ThresholdSSB, select the "best" SSB; e.g. the one with the largest RSRP.

TABLE 4-continued

1> if the default BWP is configured with PRACH resources and the active BWP is not the
default BWP;
   2> select an SSB for the default BWP with SS-RSRP above the rsrp-ThresholdSSB;
   2> if none of the SS blocks are above the rsrp-ThresholdSSB, select the "best" SSB for
the default BWP; e.g. the one with the largest RSRP.
1> else if the active BWP is not the initial BWP;
   2> select an SSB for the initial BWP with SS-RSRP above the rsrp-ThresholdSSB;
   2> if none of the SSBs are above the rsrp-ThresholdSSB, select the "best" SSB for the
initial BWP; e.g. the one with the largest RSRP.
1> determine the next available PRACH occasion(s) for the selected SSB(s) in accordance
with the PRACH_MASK_INDEX.
1> perform the preamble transmission procedure.

To provide the network with control of the autonomous BWP switching, the PDCCH order (e.g., step 270 of FIG. 11 or step 260 of FIG. 10) may also include the following parameters: 1) Flag to enable/disable autonomous BWP switching; or 2) Set of BWP IDs that may be used for autonomous BWP switching.

One or more UE variables may be defined to store the values of the parameters. For example, a UE variable named BWP_SWITCHING_CONTROL may be defined as bit field, where each bit in the field could be set or cleared to indicate if the corresponding BWP could be used for autonomous BWP switching.

In one example, the BandwidthPartID for a configured BWP may be used to associate the configured BWP with a corresponding bit in the bit field; e.g., the BWP with ID 0 would correspond to bit-0, the BWP with ID 1 would correspond to bit-1, etc. Additional bits could be reserved for the default BWP and the initial BWP. For example, if we assume a maximum of 4 BWPs may be configured for a Serving Cell, then bits 4 and 5 of the bit field could be used for the default BWP and initial BWP, respectively.

At step 271, UE 201 may perform the preamble transmission. As part of this step 271, MAC entity 204 computes the PREAMBLE_RECEIVED_TARGET_POWER and the RA-RNTI associated with the PRACH in which the preamble is transmitted. In some scenarios, the PRACH resource configurations for the configured BWPs may not be the same. To enable autonomous BWP switching in the event the channel is "busy" for the active UL BWP, MAC 204 may compute the RA-RNTI for PRACHs associated with multiple BWPs, where the multiple BWPs may include the active BWP, the default BWP, the initial BWP, or the configured inactive BWPs.

For example, if a rule-based BWP switching algorithm such as the one described in FIG. 6 or FIG. 7 is used, MAC 204 may compute the RA-RNTI associated with the active BWP and the default BWP; or active BWP and the initial BWP. The parameters may be computed for the default BWP if it is configured with PRACH resources and provided the active BWP is not the default BWP. Otherwise, the parameters may be computed for the initial BWP provided the active BWP is not the default BWP.

After computing the PREAMBLE_RECEIVED_TARGET_POWER and RA-RNTI(s), MAC entity 204 may instruct PHY 205 to transmit the preamble using the selected PRACH(s), corresponding RA-RNTI(s), PREAMBLE_INDEX, or PREAMBLE_RECEIVED_TARGET_POWER. PHY 205 may then perform sub-band LBT and BWP switching (if necessary) prior to the preamble transmission.

The following Table 5 provides example pseudo code for Preamble Transmission for a rule-based BWP switching algorithm such as the one described in FIG. 6 or FIG. 7.

TABLE 5

The MAC entity 204 should:
   1> if PREAMBLE_TRANSMISSION_COUNTER is greater than one; and
   1> if the notification of suspending power ramping counter has not been received from
lower layers; and
   1> if SS block selected is not changed for the active BWP (e.g. same as the previous
random access preamble transmission):
      2> increment PREAMBLE_POWER_RAMPING_COUNTER by 1.
   1> set PREAMBLE_RECEIVED_TARGET_POWER to ra-
PreambleInitialReceivedTargetPower + DELTA_PREAMBLE +
(PREAMBLE_POWER_RAMPING_COUNTER − 1) * powerRampingStep.
   1> compute the RA-RNTI associated with the PRACH in which the Random Access
Preamble is transmitted for the active BWP.
   1> if the default BWP is configured with PRACH resources and the active BWP is not the
default BWP;
      2> compute the RA-RNTI associated with the PRACH in which the Random
Access Preamble is transmitted for the active BWP.
   1> else if the active BWP is not the initial BWP:
      2> compute the RA-RNTI associated with the PRACH in which the Random Access
Preamble is transmitted for the active BWP.
   1> instruct the physical layer to transmit the preamble using the selected PRACH(s),
corresponding RA-RNTI(s), PREAMBLE_INDEX and
PREAMBLE_RECEIVED_TARGET_POWER.

PHY 205 may inform MAC 204 of the of the result of the preamble transmission attempt. For example, an indication (e.g., RAP Transmission Indication) may be used to inform MAC 204 of a successful preamble transmission attempt and the BWP that was used for the preamble transmission. The indication may also be used to explicitly inform MAC 204 of an unsuccessful preamble transmission; e.g. if the UL BWP was "busy" for the UL BWPs on which LBT was performed. Alternatively, depending on how the indication is designed, the absence of such an indication may be used to implicitly inform MAC 204 of the preamble transmission result.

At step 272, UE 201 may perform Random Access Response (RAR) reception. Once the preamble is transmitted, MAC 204 may start the ra-ResponseWindow at the start of the first PDCCH occasion after a fixed duration of X symbols from the end of the preamble transmission.

When performing Random Access with an NR-U SpCell. e.g., PCell for MCG and PSCell for SCG, UE 201 monitors the PDCCH of SpCell for the RAR identified by the RA-RNTI while the ra-ResponseWindow is running using the active BWP of the SpCell, where the active BWP of the SpCell corresponds to the BWP used for the preamble transmission.

When performing Random Access with an NR-U SCell, UE 201 may also monitor the PDCCH of the SpCell for the RAR, but in this case the active BWP of the SpCell may not be the same as the BWP used for the preamble transmission, since the preamble transmission occurred on a different cell, e.g., the SCell.

To increase the likelihood that the gNB 202 will succeed in accessing a channel when attempting to transmit the RAR on the downlink from the SpCell, UE 201 may monitor the PDCCH of SpCell for the RAR using multiple BWPs. Note that generally multiple BWPs may be monitored at the same time and generally some behavior may be targeted to PHY and some to MAC. The gNB 202 may then transmit the RAR using the DL BWP where the LBT indicates the channel is "free".

The RAR may include a Timing Advance Command that may be used to adjust timing for the TAG that includes the NR-U Serving Cell UE 201 is performing the random access procedure with. gNB 202 may compute the Timing Advance Command assuming the preamble transmission began at the start of the PRACH occasion. However, since UE 201 may be required to perform LBT prior to the preamble transmission, which may result in BWP switching followed by additional LBT procedures, the preamble transmission may start at time $\Delta t$ (greater than zero) with respect to the start of the PRACH occasion. MAC entity 204 may correct the Timing Advance Command by subtracting the value $\Delta t$ before it is applied. Alternatively, the PHY may maintain the value $\Delta t$ and apply the correction.

When performing Random Access with an NR-U SpCell, the Timing Advance Command may be applied for the pTAG. And when performing Random Access with an NR-U SCell, the Timing Advance Command may be applied for the sTAG that includes the NR-U SCell. After applying the Timing Advance Command, MAC entity 204 may start or restart the timeAlignmentTimer associated with the TAG.

The following Table 6 provides example pseudo code for RAR Reception for a rule-based BWP switching algorithm, such as the one described in FIG. 6 or FIG. 7.

TABLE 6

The MAC entity 204 should:
1> start the ra-ResponseWindow at the start of the first PDCCH occasion after a fixed duration of X symbols from the end of the preamble transmission;
1> monitor the PDCCH of SpCell in the active BWP for the RAR identified by the RA-RNTI corresponding to the transmitted preamble while the ra-ResponseWindow is running.
1> if a downlink assignment has been received on the PDCCH for the RA-RNTI and the received TB is successfully decoded:
  2> if the Random Access Response includes a Backoff Indicator subheader:
    3> set the PREAMBLE_BACKOFF to value of the BI field of the Backoff Indicator subheader using Table 7.2-1 of 3GPP TS 38.321, NR; Medium Access Control (MAC) Protocol Specification (Release 15), V15.0.0, which is incorporated by reference in its entirety.
  2> else:
    3> set the PREAMBLE_BACKOFF to 0 ms.
  2> if the Random Access Response includes a Random Access Preamble identifier corresponding to the transmitted PREAMBLE_INDEX:
    3> consider this Random Access Response reception successful.
  2> if the Random Access Response reception is considered successful:
    3> apply the following actions for the Serving Cell where the Random Access Preamble was transmitted:
      4> process the received Timing Advance Command;
      4> indicate the ra-PreambleInitialReceivedTargetPower and the amount of power ramping applied to the latest preamble transmission to lower layers (e.g. (PREAMBLE_POWER_RAMPING_COUNTER – 1) * powerRampingStep);
      4> process the received UL grant value and indicate it to the lower layers.
    3> consider the Random Access procedure successfully completed.
1> if ra-ResponseWindow expires, and if the Random Access Response including Random Access Preamble identifiers that matches the transmitted PREAMBLE_INDEX has not been received;
  2> consider the Random Access Response reception not successful;
  2> increment PREAMBLE_TRANSMISSION_COUNTER by 1;
  2> if PREAMBLE_TRANSMISSION_COUNTER = ra-PreambleTx-Max + 1:
    3> if the Random Access Preamble is transmitted on the SpCell:
      4> indicate a Random Access problem to upper layers.
    3> else if the Random Access Preamble is transmitted on a SCell:
      4> consider the Random Access procedure unsuccessfully completed.
  2> perform the Random Access Resource selection procedure.

Figure 12:
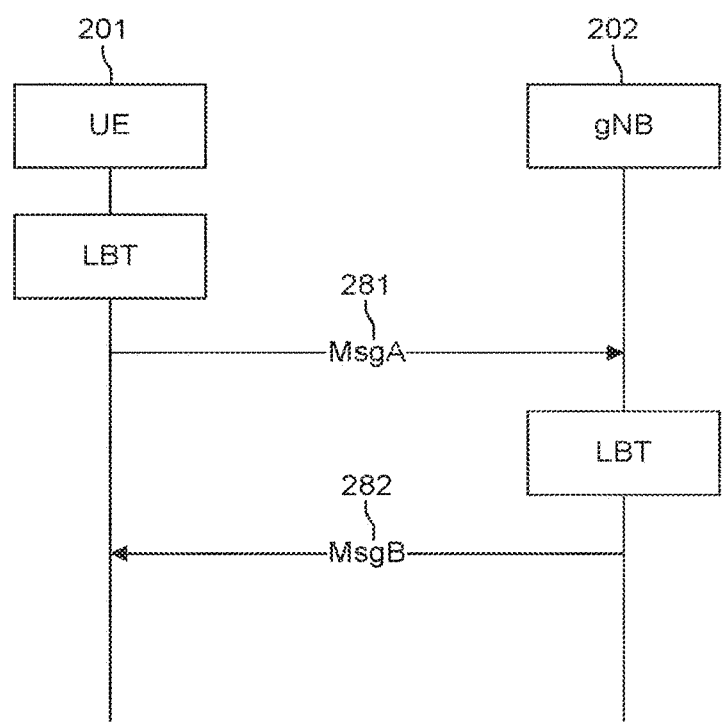
FIG. 12 illustrates an exemplary 2-Step RACH Procedure.

Disclosed below are methods to perform 2-step RACH, among other things. To reduce the number of LBT procedures performed during the Random Access procedure, a 2-step procedure may be used. FIG. 12 is an exemplary illustration of a signaling diagram used to perform a 2-step Random Access procedure. The techniques disclosed herein for the 2-step RACH may also be used when operating on channels that don't require LBT. For such deployments, the LBT procedure may not be required to be performed prior to the transmissions. In FIG. 12, at step 281, UE 201 transmits MsgA, which may include a preamble-like signal and a payload that comprises information that may be equivalent to what is transmitted in Msg3 of the 4-step RACH procedure; e.g. CCCH SDU, UE identity. MsgA may also be used for UL data transmissions; e.g. UL DCCH or UL DTCH SDUs.

In FIG. 12, step 282, UE 201 monitors for and obtains MsgB, which is transmitted by gNB 202, and may include information equivalent to what is transmitted in Msg2 and Msg4 of the 4-step RACH procedure; e.g. TA command, UL grant, TC-RNTI, UE contention resolution identity, CCCH SDU. MsgB may also be used for DL data transmissions; e.g. DL DCCH or DL DTCH SDUs. For scenarios where UE 201 does not receive MsgB, UE 201 may retransmit MsgA, where the number of retransmissions may be configured by the network. Further, UE 201 may use the same preamble-like signal when performing a MsgA retransmission. Alternatively, a different preamble-like signal may be selected for each MsgA retransmission. This behavior may be defined per the standard configured by the network.

MAC PDU (MsgA): A MsgA MAC PDU may include one or more MAC subPDUs, where each MAC subPDU may include the following: 1) a MAC subheader only (including padding); 2) a MAC subheader and a MAC SDU; 3) a MAC subheader and a MAC CE; or 4) a MAC subheader and padding. The MAC SDUs included in a MsgA MAC PDU may be of fixed or variable sizes. A MAC subheader except for fixed sized MAC CE, padding, and a MAC SDU including UL CCCH consists of the four header fields R/F/LCID/L as shown in FIG. 13 and FIG. 14. A MAC subheader for fixed sized MAC CE, padding, and a MAC SDU including UL CCCH consists of the two header fields R/LCID as shown in FIG. 15.

The MsgA MAC subheader is octet aligned and may include following fields: 1) LCID, L, F, or R. The Logical Channel ID (LCID) field identifies the logical channel instance of the corresponding MAC SDU or the type of the corresponding MAC CE or padding as described in Tables 6.2.1-1 and 6.2.1-2 of TS 38.321. There is one LCID field per MAC subheader. The LCID field size is 6 bits. The Length (L) field indicates the length of the corresponding MAC SDU or variable-sized MAC CE in bytes. There is one L field per MAC subheader except for subheaders corresponding to fixed-sized MAC CEs, padding, and MAC SDUs including UL CCCH. The size of the L field is indicated by the F field. The Format (F) field indicates the size of the Length field. There is one F field per MAC subheader except for subheaders corresponding to fixed-sized MAC CEs, padding, and MAC SDUs including UL CCCH. The size of the F field is 1 bit. The value 0 indicates 8 bits of the Length field. The value 1 indicates 16 bits of the Length field. The reserved (R) bit, set to zero.

MsgA MAC subPDU(s) with MAC CE(s) are placed after all the MAC subPDU(s) with MAC SDUs and before the MAC subPDU with padding in the MAC PDU as depicted in FIG. 16. The size of padding can be zero.

A MAC PDU used for signaling MsgB RARs may consist of one or more subPDUs and optionally padding. Each MAC subPDU may include the following: 1) a MAC subheader with Backoff Indicator only; 2) a MAC subheader with RAPID only (e.g., acknowledgment for SI request); or 3) a MAC subheader with RAPID and Msg3 RAR.

A MAC subheader with Backoff Indicator consists of five header fields E/T/R/R/BI as described in FIG. 6.1.5-1 of TS 38.321. A MAC subPDU with Backoff Indicator only is placed at the beginning of the MAC PDU, if included. 'MAC subPDU(s) with RAPID only' and 'MAC subPDU(s) with RAPID and Msg3 RAR' can be placed anywhere between MAC subPDU with Backoff Indicator only (if any) and padding (if any). A MAC subheader with RAPID consists of three header fields E/T/RAPID as described in FIG. 6.1.5-2 of TS 38.321.

Padding is placed at the end of the MAC PDU if present. Presence and length of padding is implicit based on TB size, size of MAC subPDU(s).

MAC PDU (MsgB) is disclosed below. An exemplary MsgB RAR that is octet aligned is depicted in FIG. 17 and may include the following fields: 1) A/N, 2) timing advance command, 3) UL grant, 4) temporary C-RNTI, 5) UE contention resolution identity, or 6) data. The A/N field is a flag indicating whether or not the MsgA payload was decoded successfully. For example, a value of "0" may be used to indicate the payload was decoded successfully and a value of "1" may be used to indicate the payload was not decoded successfully. The Timing Advance Command field indicates the index value TA used to control the amount of timing adjustment that the MAC entity has to apply in TS 38.213. The size of the Timing Advance Command field is 12 bits. The Uplink Grant field indicates the resources to be used on the uplink in TS 38.213. The size of the UL Grant field is 27 bits. The Temporary C-RNTI field indicates the temporary identity that is used by the MAC entity during Random Access. The size of the Temporary C-RNTI field is 16 bits. UE Contention Resolution Identity field includes the UL CCCH SDU. If the UL CCCH SDU is longer than 48 bits, this field may include the first 48 bits of the UL CCCH SDU. The data field is used for transmission of control plane signaling; e.g. an RRC message, and/or user plane data. In this example, the Data field is defined with a fixed size of 32 bits. Use of a different fixed size is not precluded. Alternatively, the Data field may be of variable length, where the length is indicated via a length field included in the MAC RAR.

The MsgB RAR may also include a QCL field that indicates the QCL relation of the DMRS of the first PDCCH. In some scenarios, not all fields of the MsgB RAR described in FIG. 17 may be used, for example, when performing a contention free 2-step RACH procedure, when there isn't DL data to transmit. For such scenarios, the unused fields may be considered reserved. Alternatively, the MsgB RAR may include a Format field, F, to indicate the presence or absence of optional fields. And in yet another alternative, the Format field may be included in the MAC subheader.

An exemplary 2-bit Format field that may be used to indicate the presence or absence of the UE Contention Resolution Identity and Data fields is defined in Table 7. Alternative Format field definitions are not precluded.

TABLE 7

Exemplary Format Field

| Format | UE Contention Resolution Identity Field | Data Field |
|---|---|---|
| 00 | Not Present | Not Present |
| 01 | Present | Not Present |
| 10 | Not Present | Present |
| 11 | Present | Present |

Figure 18:
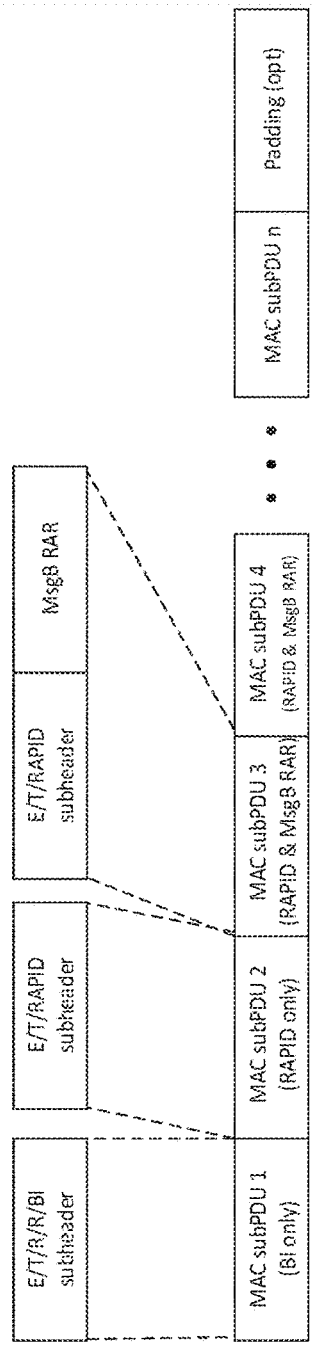
FIG. 18 illustrates an exemplary MAC PDU Consisting of MsgB RARs.

An exemplary MAC PDU consisting of MsgB RARs is shown in FIG. 18. In another alternative, the MAC PDU may consist of Msg2 and MsgB RARs. A Format field, F, may be included in the subheader or the RAR to indicate the RAR format. In one embodiment, the gNB may use Format "00" as defined in Table 1 for UEs performing a 2-step RACH procedure, while any of the defined formats may be used for UEs performing a 2-step RACH; e.g. format "10" for events such as UL/DL data arrival, format "11" events such as initial access.

MAC Procedure for 2-Step RACH is disclosed below. In Table 8 is example pseudo code for the MAC procedure for MsgA transmission. In this example, the same UE variables such as those defined in section 5.1.1 of TS 38.321 and used to control 4-step RACH procedure may also be used to control the 2-step RACH procedure. However, the use of UE variables and configuration parameters specific to the 2-step RACH procedure is not precluded.

The RA-RNTI associated with the PRACH in which the Random Access Preamble is transmitted, may computed as follows:

$$RA\text{-}RNTI = 1 + s\_id + 14 \times t\_id + 14 \times 80 \times f\_id + 14 \times 80 \times 8 \times ul\_carrier\_id$$

where $s\_id$ is the index of the first OFDM symbol of the specified PRACH ($0 \leq s\_id < 14$), $t\_id$ is the index of the first slot of the specified PRACH in a system frame ($0 \leq t\_id < 80$), $f\_id$ is the index of the specified PRACH in the frequency domain ($0 \leq f\_id < 8$), and $ul\_carrier\_id$ is the UL carrier used for Msg1 transmission (0 for NUL carrier, and 1 for SUL carrier).

In Table 9 is example pseudo code for the MAC procedure for MsgB reception. In this example, the same UE variables used to control 4-step RACH procedure are also used to control the 2-step RACH procedure. However, the use of UE variables and configuration parameters specific to the 2-step RACH procedure is not precluded.

TABLE 8

The MAC entity 204 should, for each MsgA transmission:
1> if this is the first MsgA transmission within this Random Access procedure:
    2> if the transmission is not being made for the CCCH logical channel:
        3> indicate to the Multiplexing and assembly entity to include a C-RNTI MAC CE in the subsequent uplink transmission.
    2> obtain the MAC PDU to transmit from the Multiplexing and assembly entity and store it in the Msg3 buffer.
    2> deliver information for the selected PUSCH and the associated HARQ information to the HARQ entity.
1> if PREAMBLE_TRANSMISSION_COUNTER is greater than one; and
1> if the notification of suspending power ramping counter has not been received from lower layers; and
1> if SSB selected is not changed (e.g. same as the previous Random Access Preamble transmission):
    2> increment PREAMBLE_POWER_RAMPING_COUNTER by 1.
1> select the value of DELTA_PREAMBLE according to subclause 7.3 of TS 38.321;
1> set PREAMBLE_RECEIVED_TARGET_POWER to preambleReceivedTargetPower + DELTA_PREAMBLE + (PREAMBLE_POWER_RAMPING_COUNTER − 1) × PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit MsgA using the selected PUSCH, PRACH, corresponding RA-RNTI (if available), PREAMBLE_INDEX and PREAMBLE_RECEIVED_TARGET_POWER.

TABLE 9

Once MsgA is transmitted and regardless of the possible occurrence of a measurement gap, the MAC entity 204 should:
1> start the ra-ResponseWindow configured in RACH-ConfigCommon at the first PDCCH occasion as specified in TS 38.213 from the end of the MsgA transmission;
1> monitor the PDCCH of the SpCell for Random Access Response(s) identified by the RA-RNTI while the ra-ResponseWindow is running.
1> if a downlink assignment has been received on the PDCCH for the RA-RNTI and the received TB is successfully decoded:
    2> if the Random Access Response includes a MAC subPDU with Backoff Indicator:
        3> set the PREAMBLE_BACKOFF to value of the BI field of the MAC subPDU using Table 7.2-1 of TS 38.321, multiplied with SCALING_FACTOR_BI.
    2> else:
        3> set the PREAMBLE_BACKOFF to 0 ms.
    2> if the Random Access Response includes a MAC subPDU with Random Access Preamble identifier corresponding to the transmitted PREAMBLE_INDEX:
        3> if the Random Access Response includes a MAC subPDU with RAPID only:
            4> consider the Random Access procedure successfully completed;
            4> indicate the reception of an acknowledgement for SI request to upper layers.
        3> else:
            4> apply the following actions for the Serving Cell where MsgA was transmitted:
                5> process the received Timing Advance Command;
                5> indicate the preambleReceivedTargetPower and the amount of power ramping applied to the latest MsgA Random Access Preamble transmission to lower layers (e.g. (PREAMBLE_POWER_RAMPING_COUNTER – 1) × PREAMBLE_POWER_RAMPING_STEP);
                5> process the received UL grant value and indicate it to the lower layers;
            4> if the A/N field in the Random Access Response indicates "ACK":
                5> if the MsgA Random Access Preamble was not selected by the MAC entity among the contention-based MsgA Random Access Preamble(s):
                    6> consider the Random Access procedure successfully completed.
                5> else:
                    6> if the C-RNTI MAC CE was included in Msg3:
                        7> discard the TEMPORARY_C-RNTI;
                        7> consider the Random Access procedure successfully completed.
                    6> else if the CCCH SDU was included in MsgA:
                        7> if MsgB includes a UE Contention Resolution Identity; and
                        7> if the UE Contention Resolution Identity in MsgB matches the CCCH SDU transmitted in MsgA:
                            8> finish the disassembly and demultiplexing of the MAC PDU;
                            8> if this Random Access procedure was initiated for SI request:
                                9> indicate the reception of an acknowledgement for SI request to upper layers.
                            8> else:
                                9> set the C-RNTI to the value of the TEMPORARY_C-RNTI;
                            8> discard the TEMPORARY_C-RNTI;
                            8> consider the Random Access procedure successfully completed.
                      7> else:
                          8> discard the TEMPORARY_C-RNTI;
                          8> consider the MsgA transmission not successful.
        4> else:
            5> consider the MsgA transmission not successful.
1> if ra-ResponseWindow configured in RACH-ConfigCommon expires, and if the Random Access Response including Random Access Preamble identifiers that matches the transmitted PREAMBLE_INDEX has not been received; or
1> the MsgA transmission is considered not successful
    2> increment PREAMBLE_TRANSMISSION_COUNTER by 1;
    2> if PREAMBLE_TRANSMISSION_COUNTER = preambleTransMax + 1:
        3> if MsgA is transmitted on the SpCell:
            4> indicate a Random Access problem to upper layers;
            4> if this Random Access procedure was triggered for SI request:
                5> consider the Random Access procedure unsuccessfully completed.
        3> else if the Random Access Preamble is transmitted on a SCell:
            4> consider the Random Access procedure unsuccessfully completed.
    2> if the Random Access procedure is not completed:
        3> select a random backoff time according to a uniform distribution between 0 and the PREAMBLE_BACKOFF;
            4> perform the Random Access Resource selection procedure after the backoff time.

The MAC entity may stop ra-ResponseWindow (and hence monitoring for Random Access Response(s)) after successful reception of a Random Access Response including Random Access Preamble identifiers that matches the transmitted PREAMBLE_INDEX. HARQ operation may not be applicable to the Random Access Response transmission.

Figure 19:
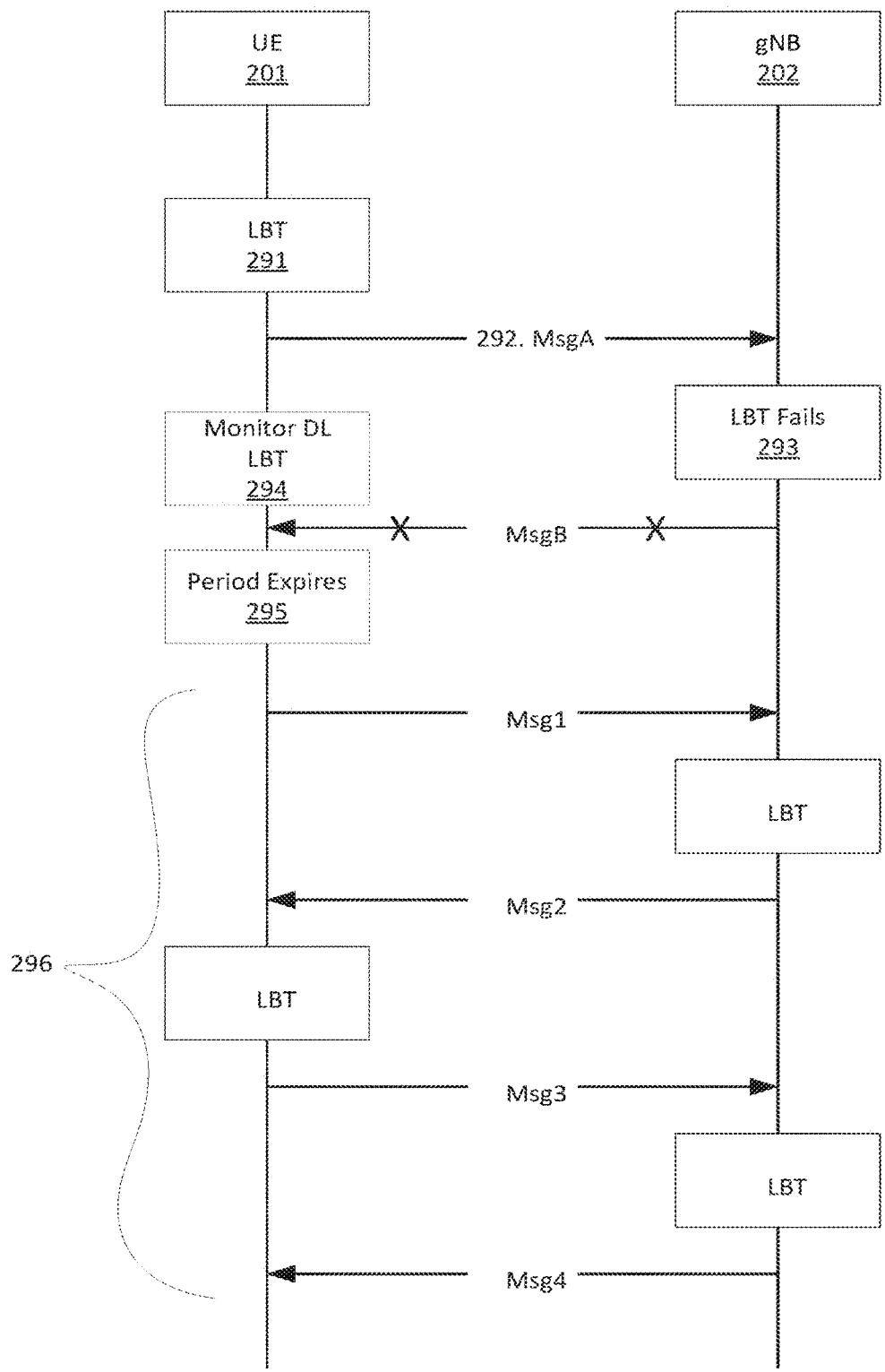
FIG. 19 illustrates an exemplary Fallback to 4-Step RACH Procedure.

Fallback to 4-Step RACH: For scenarios where the 2-step RACH procedure fails, the UE may fallback to the 4-step RACH procedure. Fallback to the 4-step RACH procedure may occur after a configured number of failed attempts. FIG. 19 is an example illustration of a signaling diagram where the UE falls back to the 4-step RACH procedure after 1 failed attempt. An example description of steps of FIG. 19 is disclosed in steps 291-296 of FIG. 19. At step 291, UE 201 performs LBT. At step 292, transmits MsgA to gNB 202. At step 293, LBT fails and therefore MsgB is not sent. At step 294, UE 201 monitors the DL for a PDCCH identified by the RA-RNTI during the ra-ResponseWindow. At step 295, the ra-ResponseWindow expires. At step 296, UE 201 commences the 4-step RACH procedure, performs LBT, transmits the Random Access Preamble as described in TS 38.321, and performs other mechanics as described below. UE 201 performs Random Access Response reception as described in TS 38.321. UE 201 performs LBT and transmits the MsgA payload using the resources scheduled via the RAR grant as described in TS 38.321. UE 201 performs Contention Resolution as described in TS 38.321.

Figure 20:
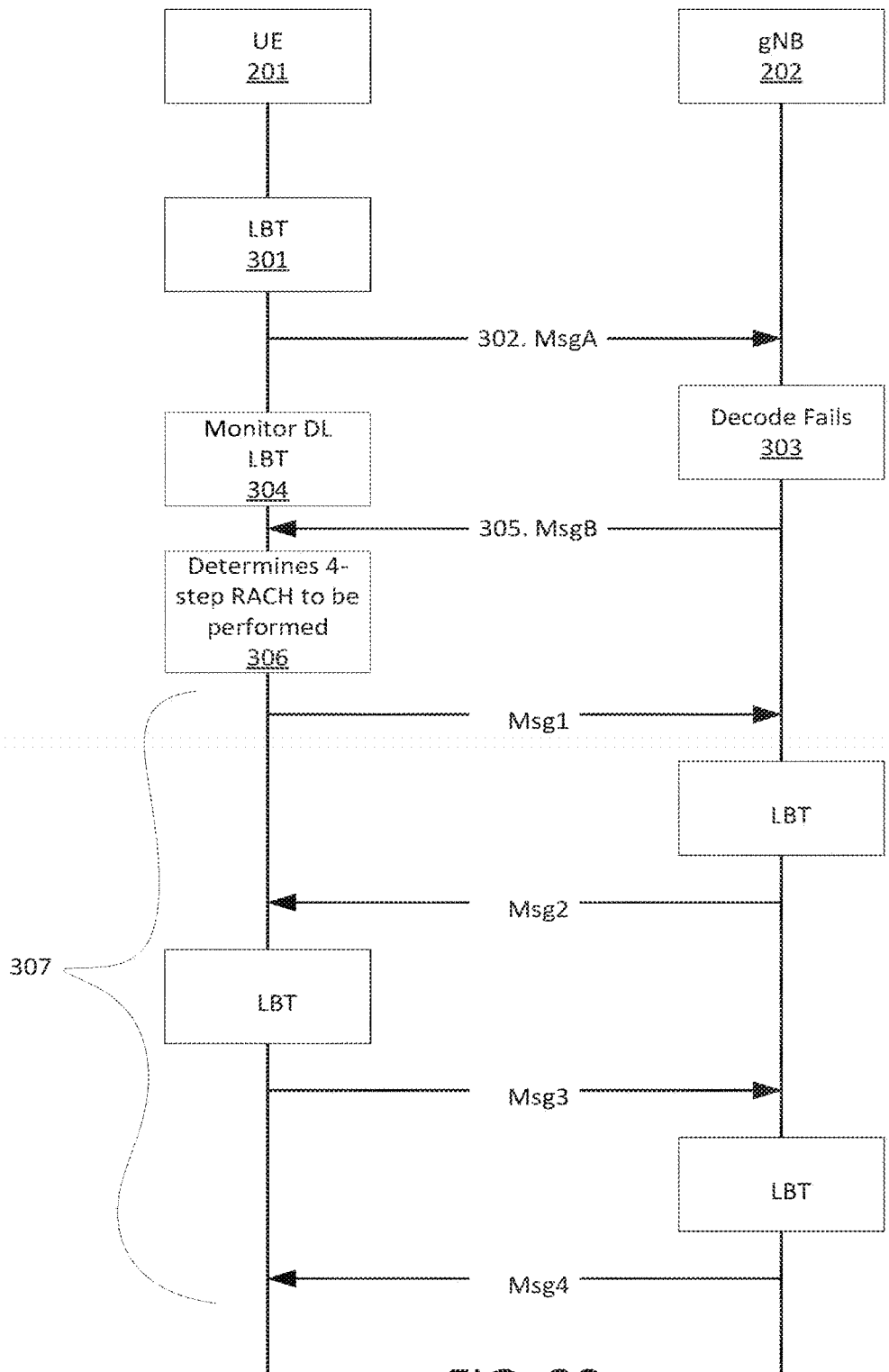

For scenarios where gNB 202 can detect the transmission of MsgA, e.g. detect the preamble-like signal, but is unable to successfully decode the payload, gNB 202 may provide an indication via MsgB that may be used to trigger fallback to the 4-step RACH procedure as shown in FIG. 20. This may help to reduce the latency with completing the RACH procedure since UE 201 may commence with the fallback immediately rather than waiting until the ra-ResponseWindow expires.

GNB 202 may indicate this condition to UE 201 via the A/N field of the MAC RAR proposed for MsgB that is described herein or by including a MAC subheader with a RAPID only in the MAC PDU, where the RAPID corresponds to the preamble-like signal included in the MsgA transmission. Upon reception of this indication, the MAC entity may commence the 4-step RACH procedure immediately or after a configured backoff time. An example description of steps of FIG. 20 is disclosed in steps 301-306 of FIG. 20. At step 301, UE 201 performs LBT. At step 302, UE 201 transmits MsgA to gNB 202. At step 303, GNB 202 detects the MsgA preamble, but is not able to decode the MsgA payload. At step 304, UE 201 monitors the DL for a PDCCH identified by the RA-RNTI during the ra-ResponseWindow. At step 305, UE 201 obtains MsgB indicating the MsgA payload was not decoded successfully. GNB 202 may indicate this condition to UE 201 via the A/N filed of the MAC RAR proposed for MsgB that is described herein or by including a MAC subheader with a RAPID only in the MAC PDU, where the RAPID corresponds to the preamble-like signal included in the MsgA transmission. At step 306, based on the obtained message of step 305, UE determines 4-step RACH to be performed. At step 307, UE 201 commences the 4-step RACH procedure, performs LBT, transmits the Random Access Preamble as described in TS 38.321, and performs other mechanics as described below. UE 201 may perform Random Access Response reception as described in TS 38.321. UE 201 may perform LBT and transmit the MsgA payload using the resources scheduled via the RAR grant as described in TS 38.321. UE 201 performs Contention Resolution as described in TS 38.321.

Figure 21:
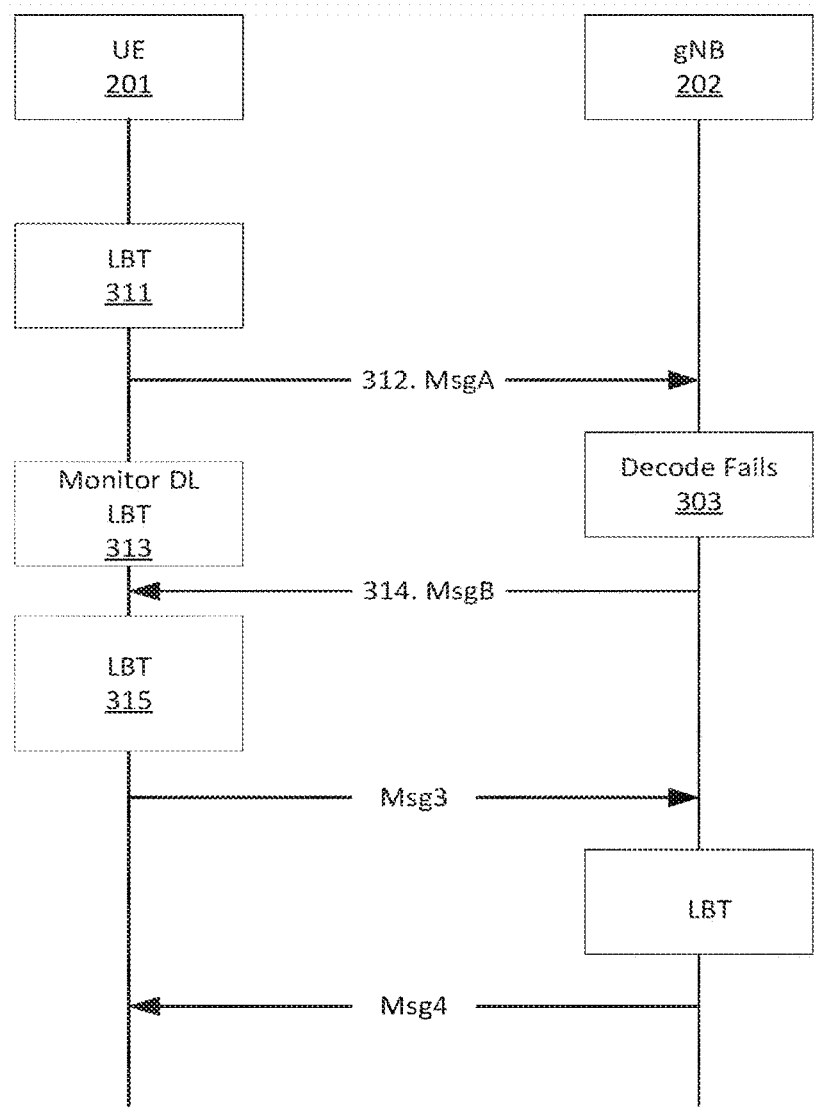
FIG. 21 illustrates an exemplary Fallback to 4-Step RACH Procedure Triggered via MsgB.

In another example, upon receiving an indication that gNB 202 is unable to successfully decode the payload, UE 201 may commence with step-3 of the 4-step RACH procedure immediately (e.g., FIG. 21) or after a configured backoff time. The UL grant signaled via the RAR may be used for the Msg3 transmission. This alternative may reduce the latency even further since Msg1 and Msg2 of the 4-step RACH procedure may be skipped. An example description of steps of FIG. 21 is disclosed as follows. At step 311, UE 201 performs LBT. At step 312, UE 201 transmits MsgA to gNB 202. After the transmission of MsgA, the UE begins monitoring the DL for a PDCCH identified by the RA-RNTI during the ra-ResponseWindow At step 313, GNB 202 detects the MsgA preamble, but is not able to decode the MsgA payload. At step 313, UE 201 monitors the DL for a PDCCH identified by the RA-RNTI during the ra-ResponseWindow. At step 314, UE 201 obtains MsgB comprised of a MAC RAR used for MsgB as described herein, where the A/N field of the RAR is set to "NACK". At step 315, UE 201 performs LBT and transmits the MsgA-like payload using the resources scheduled via the RAR grant. In this step, the UE is not transmitting MsgA. It is transmitting Msg3, where the data that is signaling via Msg3 corresponds to the MsgA payload. The RAR grant schedules the Msg3 transmission. The MsgA payload is signaled via the Msg3 transmission. UE 201 monitors the DL for a PDCCH identified by the TC-RNTI signaled via MsgB, receives Msg4 and performs Contention Resolution as described in TS 38.321.

Figure 22:
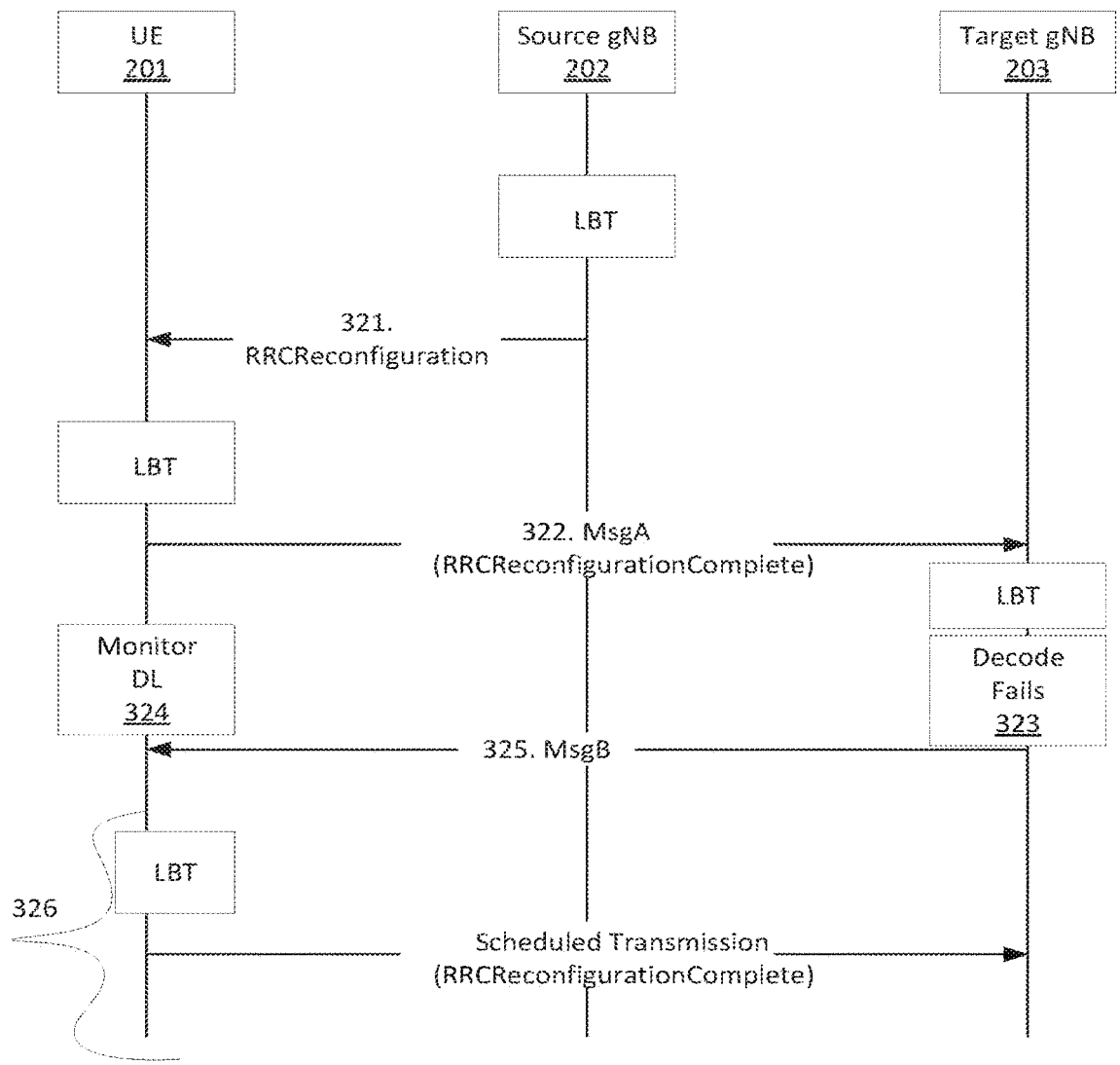
FIG. 22 illustrates an exemplary 2-Step RACH Procedure during Handover.

Fallback to Scheduled Transmission During Handover: For scenarios where the 2-step RACH is used during handover, fallback to scheduled transmissions may be used for completion of the handover procedure when the 2-step RACH fails, as is shown in FIG. 22. An example description of steps of FIG. 22 is disclosed as follows (e.g., steps 321-324 of FIG. 22). At step 321, the source gNB provides the RRC configuration to UE 201 in the Handover Command; e.g. RRCReconfiguration message. The Handover Command message may include cell ID and information required to access the target cell so that UE 201 can access the target cell without reading system information. For some cases, the information required for contention-based and contention-free random access can be included in the Handover Command message. The access information to the target cell may include beam specific information, if any. At step 322, UE 201 transmits the RRCReconfigurationComplete message via MsgA. At step 323, GNB 202 detects the MsgA preamble, but is not able to decode the MsgA payload; e.g. the RRCReconfigurationComplete message. At step 324, UE 201 monitors the DL for a PDCCH identified by the RA-RNTI or C-RNTI during the ra-ResponseWindow. At step 325, UE 201 obtains MsgB comprised of a MAC RAR used for MsgB as described herein, where the A/N field of the RAR is set to "NACK". At step 326, UE 201 performs LBT and transmits the MsgA payload, e.g. the RRCReconfigurationComplete message, using the resources scheduled via the RAR grant.

Disclosed below are techniques associated with problem statement 2 (e.g., the second issue), in which UE 201 may perform LBT prioritization in support of random access prioritization procedures. UE 201 may perform LBT prioritization in support of random access prioritization procedure, for example for the case of Handovers using contention-based access or for the case of Beam Failure Recovery (BFR) procedure. In the case of UL data arrival when the UL is "not synchronized" or there are no PUCCH resources, the logical channel triggering the Scheduling Request may be used to determine the LBT prioritization.

UE 201 may be configured with different values of LBT parameters, such as Channel Access Priority Class or energy detection threshold, in support of LBT prioritization. The corresponding parameters for channel access priority class may include 1) Minimum contention window; 2) Maximum contention window; 3) Maximum occupancy time; 4) Allowed contention window sizes; or 5) Number of consecutive time periods (e.g., slots) duration for the carrier sensing.

UE 201 may perform LBTs during the Random Access procedure with the same priority. Alternatively, the first LBT may be performed with a first priority, and subsequent LBTs may be performed with the "highest" to minimize the interruption caused by LBT during the RACH procedure.

Figure 23:
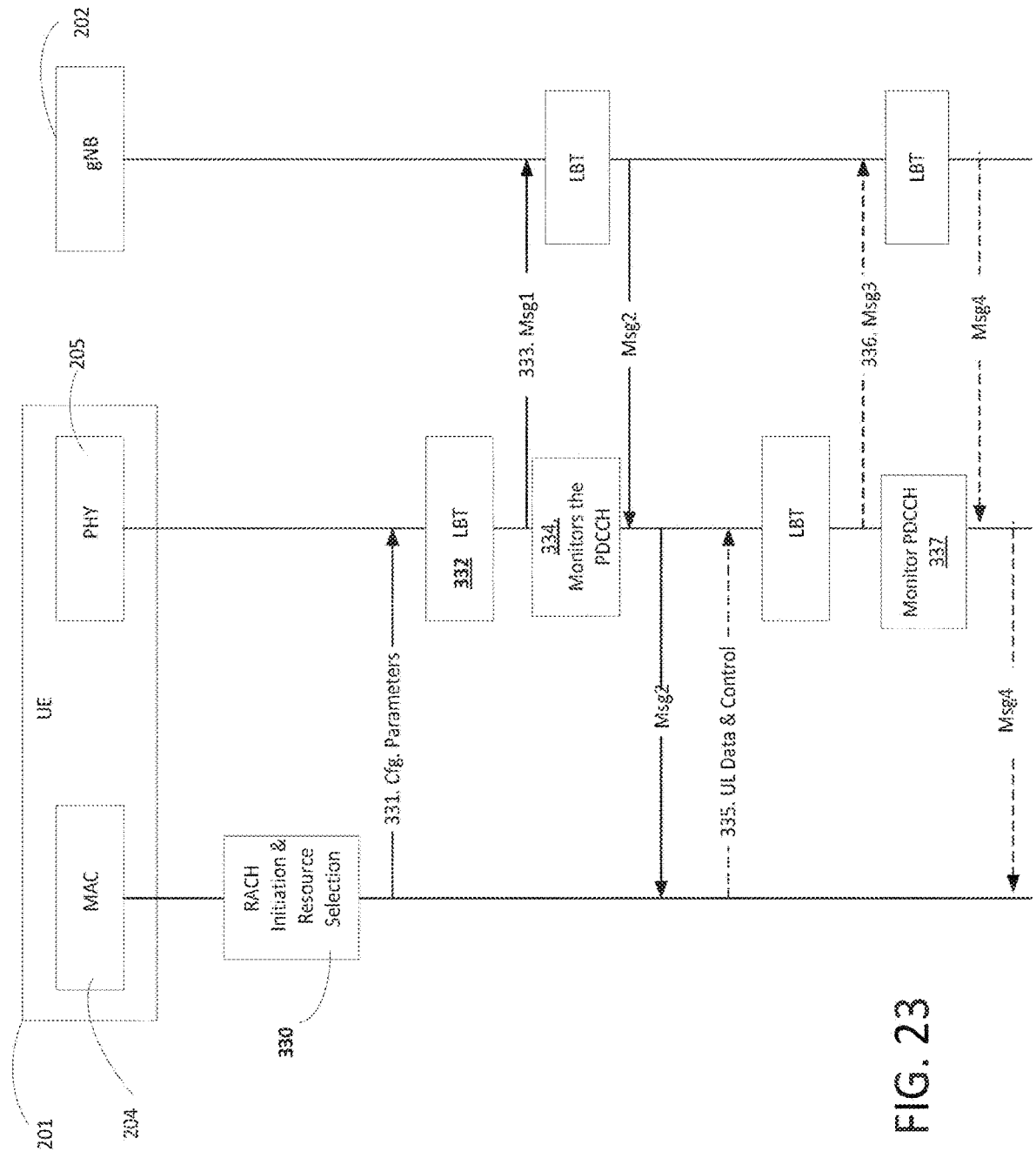
FIG. 23 illustrates an exemplary Prioritized Random Access with an NR-U Serving Cell.

FIG. 23 is an exemplary illustration of signaling that may be used when performing prioritized Random Access with an NR-U Serving Cell. At step 330, the Random Access procedure may be initiated at UE 201 and UE 201 performs Random Access Resource selection. At step 331, the MAC entity 204 provides PHY 205 with a set of configuration parameters to configure the preamble transmission, which include a set of LBT parameters that are used to provide prioritized random access. At step 332, PHY 205 performs LBT and if the channel is "free", the preamble (Msg1) is transmitted at step 333. If the preamble was transmitted in step 333, UE 201 monitors, at step 334, the PDCCH for the RAR. At step 335, if a contention-based random access procedure is being performed, MAC 204 provides PHY 205 with the UL data and control parameters that are needed for the Msg3 transmission at step 336. The Msg3 transmission at step 336 may be performed with the same priority as Msg1. Alternatively, the Msg3 transmission may be performed with the highest priority to ensure the interruption due to LBT is minimized. At step 334, if Msg3 was transmitted in step 333, UE 201 monitors for the PDCCH for Msg4.

Table 10 provides translations of some of the abbreviations as disclose herein.

TABLE 10

Abbreviations and Definitions

| Abbreviations | Definitions |
|---|---|
| ACK | Acknowledgement |
| ARQ | Automatic Repeat Request |
| BA | Bandwidth Adaption |
| BFR | Beam Failure Recovery |
| BWP | Bandwidth Part |
| CA | Carrier Aggregation |
| CBR | Channel Busy Ratio |
| CCCH | Common Control Channel |
| CE | Control Element |
| C-RNTI | Cell Radio-Network Temporary Identifier |
| DC | Duel Connectivity |
| DCCH | Dedicated Control Channel |
| DL | Downlink |
| DMRS | Demodulation Reference Signal |
| DTCH | Dedicated Traffic Channel |
| DTX | Discontinuous Transmission |
| DwPTS | Downlink Pilot Timeslot |
| eMBB | enhanced Mobile Broadband |
| eNB | Evolved Node B |
| gNB | NR NodeB |
| HARQ | Hybrid ARQ |
| KPI | Key Performance Indicators |
| L1 | Layer 1 |
| L2 | Layer 2 |
| L3 | Layer 3 |
| LAA | License Assisted Access |
| LBT | Listen-Before-Talk |
| LCID | Logical Channel ID |
| LTE | Long Term Evolution |
| MAC | Medium Access Control |
| MaxCL | Maximum Coupling Loss |
| MCG | Master Cell Group |
| MIMO | Multiple-Input and Multiple-Output |
| Msg1 | First Message of random access procedure |
| Msg3 | Third Message of random access procedure |
| MTC | Machine-Type Communications |
| mMTC | Massive Machine Type Communication |
| NR | New Radio |
| NR-U | NR Unlicensed |
| OFDM | Orthogonal Frequency Division Multiplexing |
| PCell | Primary Cell |
| PDCCH | Physical Downlink Control Channel |
| PDU | Protocol Data Unit |
| PHY | Physical Layer |
| PRACH | Physical Random Access Channel |

TABLE 10-continued

Abbreviations and Definitions

| Abbreviations | Definitions |
|---|---|
| PSCell | Primary Secondary Cell |
| pTAG | Primary Timing Advance Group |
| PUCCH | Physical Uplink Control Channel |
| QCL | Quasi Co-Located |
| QoS | Quality of Service |
| RACH | Random Access Channel |
| RAN | Radio Access Network |
| RAP | Random Access Preamble |
| RAPID | Random Access Preamble ID |
| RAR | Random Access Response |
| RA-RNTI | Random Access Radio Network Temporary Identifier |
| RAT | Radio Access Technology |
| RO | RACH Occasion |
| RRC | Radio Resource Control |
| RSRP | Reference Signal Received Power |
| RTS | Request-to-Send |
| RX | Receive |
| SA | Standalone |
| SCell | Secondary Cell |
| SCG | Secondary Cell Group |
| SDU | Service Data Unit |
| SI | System Information |
| SpCell | Special Cell |
| SR | Scheduling Request |
| SS | Synchronization Signal |
| SSB | SS Block |
| sTAG | Secondary Timing Advance Group |
| SUL | Supplementary Uplink |
| TAG | Timing Advance Group |
| TC-RNTI | Temporary Cell Radio Network Temporary Identifier |
| TRP | Transmission and Reception Point |
| TX | Transmit |
| UE | User Equipment |
| UL | Uplink |
| URLLC | Ultra-Reliable and Low Latency Communications |

It is understood that the entities performing the steps illustrated herein, such as FIG. 5, and FIG. 10-FIG. 23, may be logical entities (e.g., MAC 204 and PHY 205). The steps may be stored in a memory of, and executing on a processor of, a device, server, or computer system such as those illustrated in FIG. 25C or FIG. 25D. Skipping steps, combining steps, or adding steps between exemplary methods disclosed herein (e.g., FIG. 5-FIG. 7 and FIG. 10-FIG. 23) is contemplated.

Figure 24:
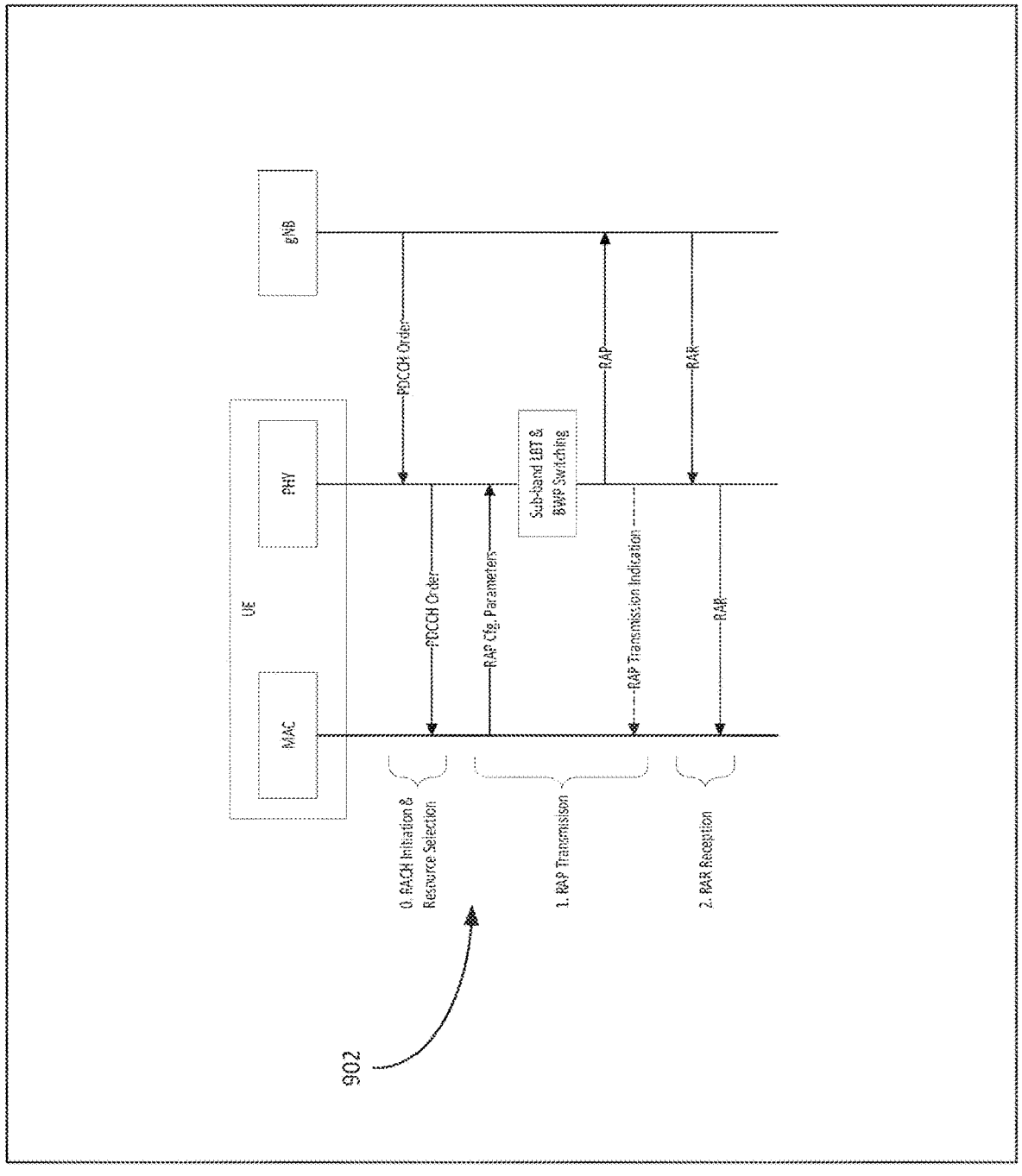
FIG. 24 illustrates an exemplary display that may be generated based on the methods and systems of mobility signaling load reduction.

FIG. 24 illustrates an exemplary display (e.g., graphical user interface) that may be generated based on the methods and systems associated with random access with NR-U cells, as discussed herein. Display interface 901 (e.g., touch screen display) may provide text in block 902 associated with random access with NR-U cells, such as Serving Cell Using Sub-Band LBT and BWP Switching related parameters, method flow, and associated current conditions. Progress of any of the steps (e.g., sent messages or success of steps) discussed herein may be displayed in block 902. In addition, graphical output 902 may be displayed on display interface 901.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 25A:
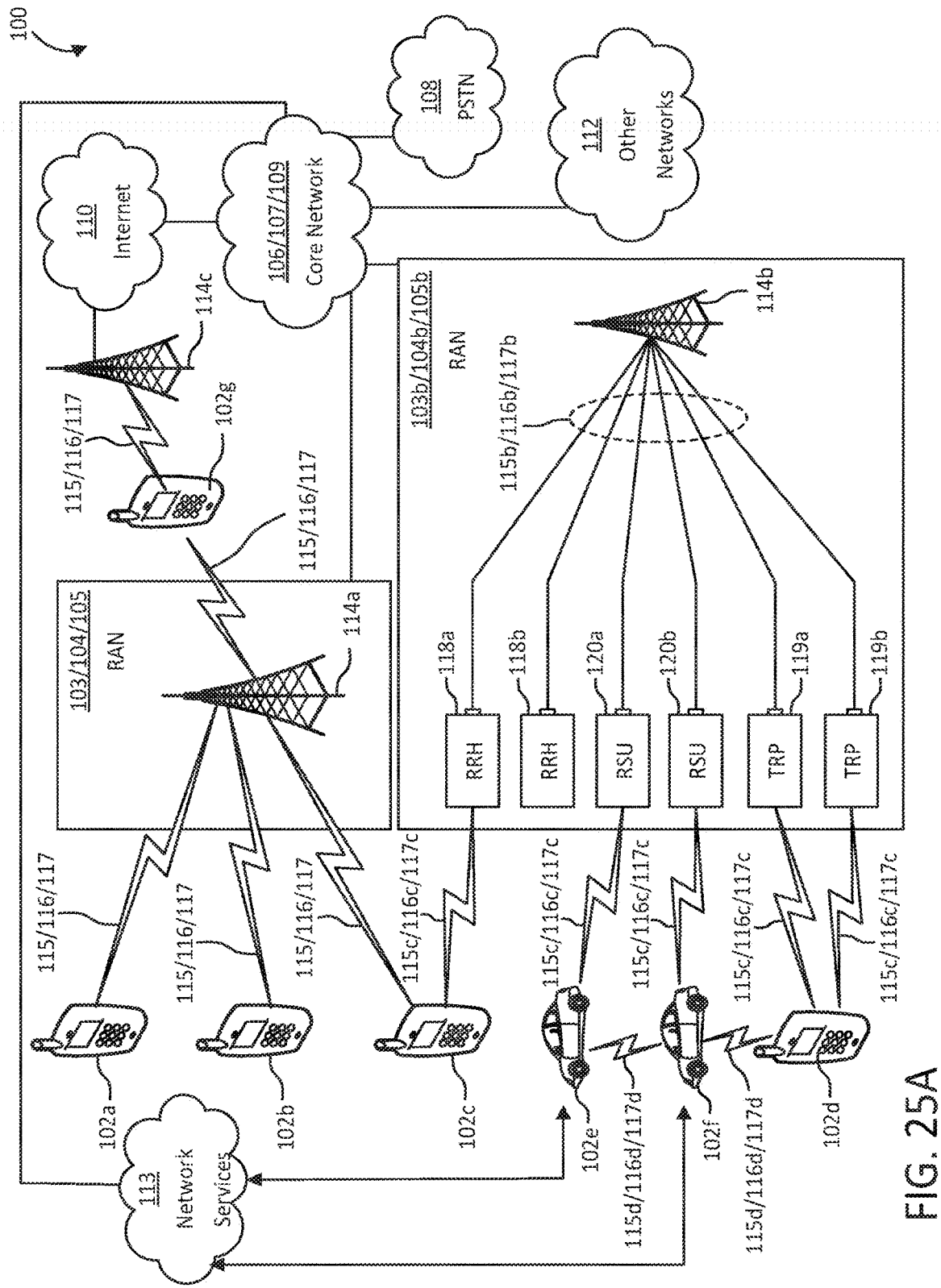
FIG. 25A illustrates an example communications system.

FIG. 25A illustrates an example communications system 100 in which the methods and apparatuses of random access with NR-U cells, such as the systems and methods illustrated in FIG. 5-FIG. 7 and FIG. 10-FIG. 23 described and claimed herein may be used. The communications system 100 may include wireless transmit/receive units (WTRUs) 102*a*, 102*b*, 102*c*, 102*d*, 102*e*, 102*f*, or 102*g* (which generally or collectively may be referred to as WTRU 102 or WTRUs 102). The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102*a*, 102*b*, 102*c*, 102*d*, 102*e*, 102*f*, or 102*g* may be any type of apparatus or device configured to operate or communicate in a wireless environment. Although each WTRU 102*a*, 102*b*, 102*c*, 102*d*, 102*e*, 102*f*, or 102*g* may be depicted in FIG. 25A, FIG. 25B, FIG. 25C, FIG. 25D, FIG. 25E, or FIG. 25F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114*a* and a base station 114*b*. In the example of FIG. 25A, each base stations 114*a* and 114*b* is depicted as a single element. In practice, the base stations 114*a* and 114*b* may include any number of interconnected base stations or network elements. Base stations 114*a* may be any type of device configured to wirelessly interface with at least one of the WTRUs 102*a*, 102*b*, and 102*c* to facilitate access to one or more communication networks, such as the core network 106/107/109, the Internet 110, Network Services 113, or the other networks 112. Similarly, base station 114*b* may be any type of device configured to wiredly or wirelessly interface with at least one of the Remote Radio Heads (RRHs) 118*a*, 118*b*, Transmission and Reception Points (TRPs) 119*a*, 119*b*, or Roadside Units (RSUs) 120*a* and 120*b* to facilitate access to one or more communication networks, such as the core network 106/107/109, the Internet 110, other networks 112, or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, or other networks 112

TRPs 119*a*, 119*b* may be any type of device configured to wirelessly interface with at least one of the WTRU 102*d*, to facilitate access to one or more communication networks, such as the core network 106/107/109, the Internet 110, Network Services 113, or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/ 105, which may also include other base stations or network elements (not shown), such as a Base Station Controller (BSC), a Radio Network Controller (RNC), relay nodes, etc. Similarly, the base station 114*b* may be part of the RAN 103*b*/104*b*/105*b*, which may also include other base stations or network elements (not shown), such as a BSC, a RNC, relay nodes, etc. The base station 114*a* may be configured to transmit or receive wireless signals within a particular geographic region, which may be referred to as a cell (not shown). Similarly, the base station 114*b* may be configured to transmit or receive wired or wireless signals within a particular geographic region, which may be referred to as a cell (not shown) for methods, systems, and devices of random access with NR-U cells, as disclosed herein. Similarly, the base station 114*b* may be configured to transmit or receive wired or wireless signals within a particular geographic region, which may be referred to as a cell (not shown). The cell may further be divided into cell sectors. For example, the cell associated with the base station 114*a* may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 25A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of random access with NR-U cells, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 25A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 25A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of random access with NR-U cells, as disclosed herein. For example, the WTRU 102g shown in FIG. 25A may be configured to communicate with the base station 114a, which may employ a cellular-based radio technology, and with the base station 114c, which may employ an IEEE 802 radio technology.

Although not shown in FIG. 25A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 25B:
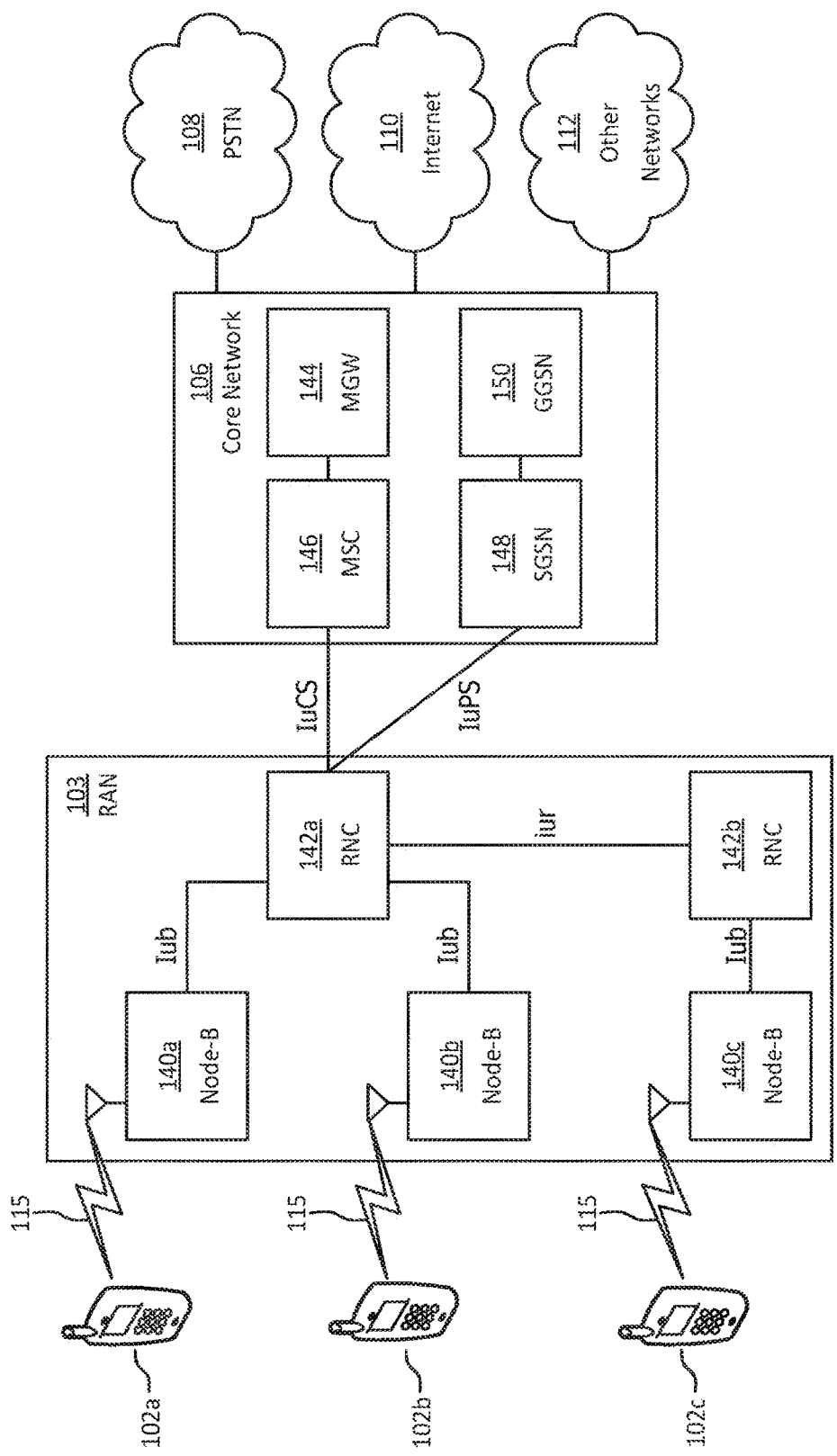
FIG. 25B illustrates an exemplary system that includes RANs and core networks.

FIG. 25B is a system diagram of an example RAN 103 and core network 106 that may implement methods, systems, and devices of random access with NR-U cells, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 25B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 25B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 25B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 25C:
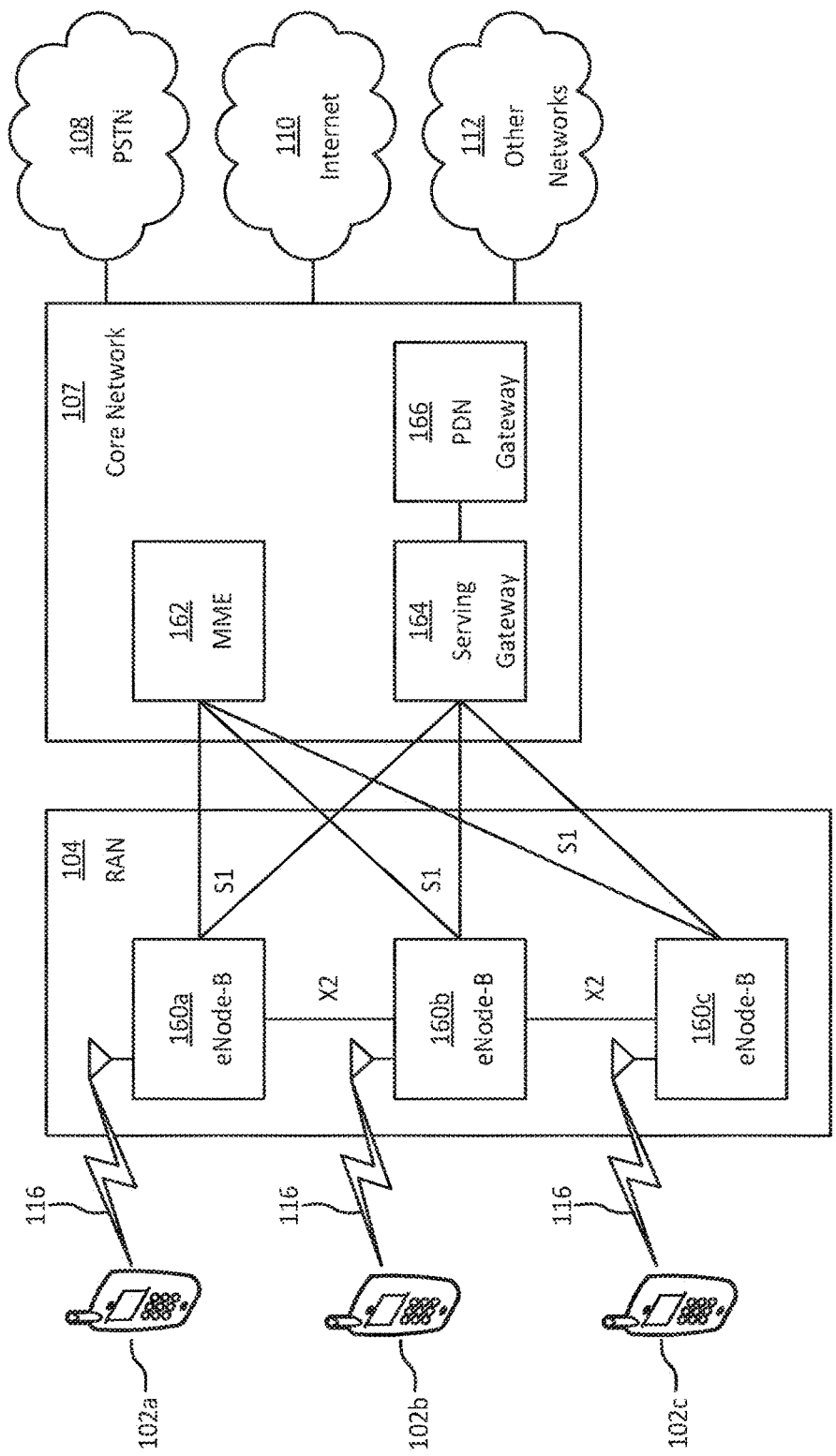
FIG. 25C illustrates an exemplary system that includes RANs and core networks.

FIG. 25C is a system diagram of an example RAN 104 and core network 107 that may implement methods, systems, and devices of random access with NR-U cells, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 25C, the eNode-Bs 160a, 160b, and 160c may communicate with one another over an X2 interface.

The core network 107 shown in FIG. 25C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 25D:
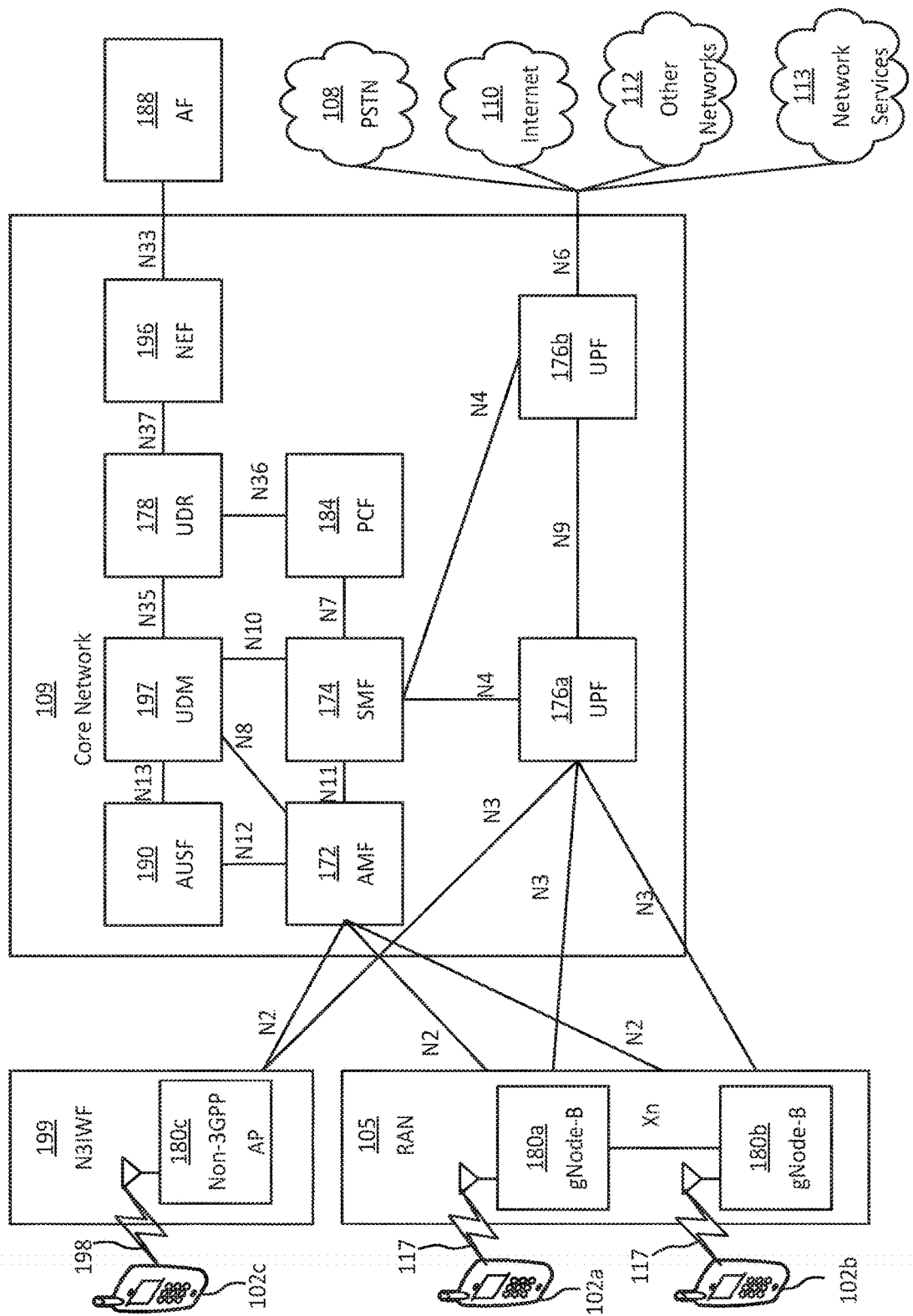
FIG. 25D illustrates an exemplary system that includes RANs and core networks.

FIG. 25D is a system diagram of an example RAN 105 and core network 109 that may implement methods, systems, and devices of random access with NR-U cells, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 25D, the gNode-Bs 180a and 180b may communicate with one another over an Xn interface, for example.

The core network 109 shown in FIG. 25D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in Figure x1G.

In the example of FIG. 25D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 25D shows that network functions directly connect to one another, however, it should be appreciated that they may communicate via routing agents such as a diameter routing agent or message buses.

In the example of FIG. 25D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 25D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 25D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 25D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

Figure 25E:
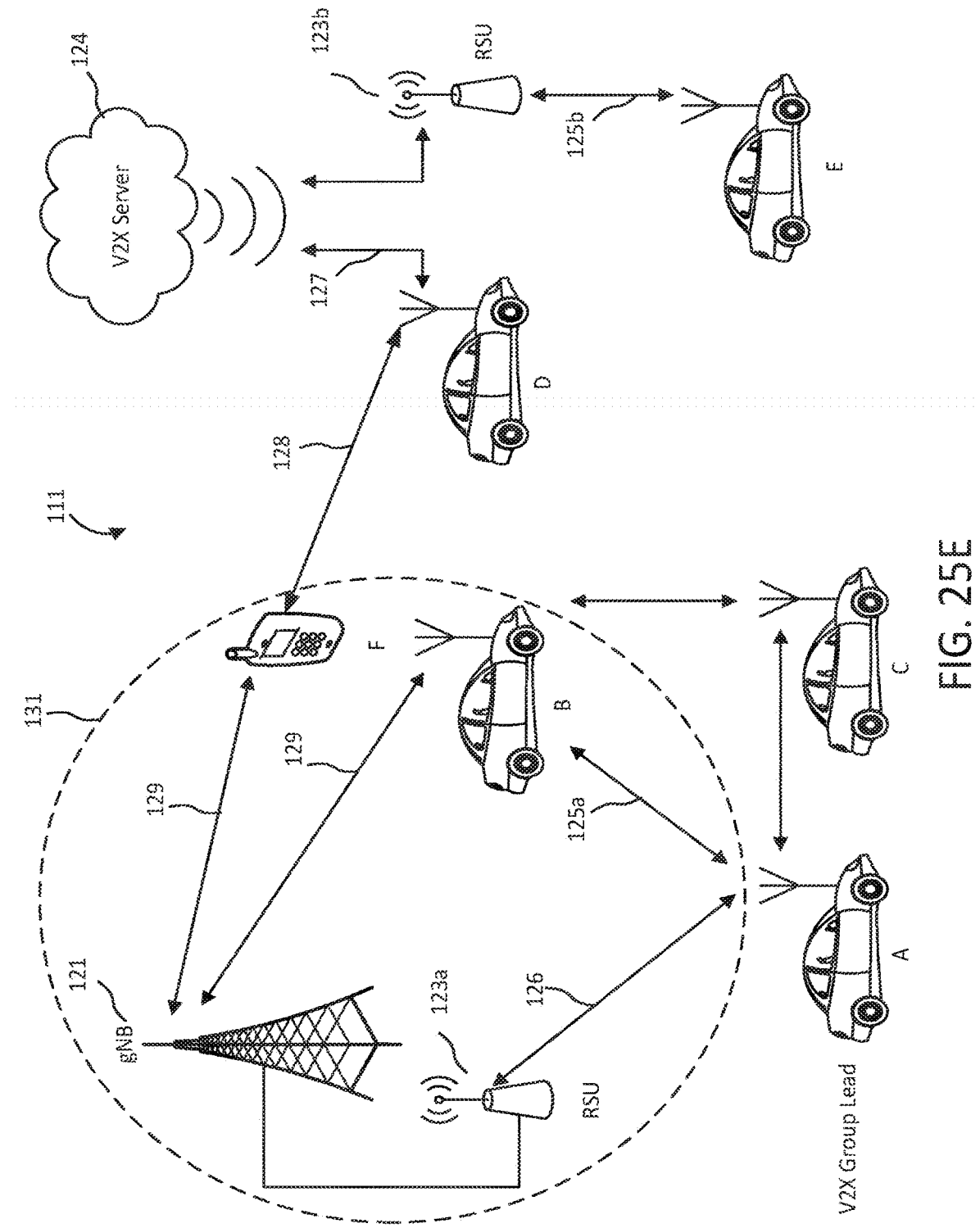
FIG. 25E illustrates another example communications system.

The core network entities described herein and illustrated in FIG. 25A, FIG. 25C, FIG. 25D, or FIG. 25E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 25A, FIG. 25B, FIG. 25C, FIG. 25D, or FIG. 25E are provided by way of example only, and it is understood that the subject matter disclosed and claimed herein may be embodied or implemented in any similar communication system, whether presently defined or defined in the future.

FIG. 25E illustrates an example communications system 111 in which the systems, methods, apparatuses that implement random access with NR-U cells, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 25E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 25E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 25F:
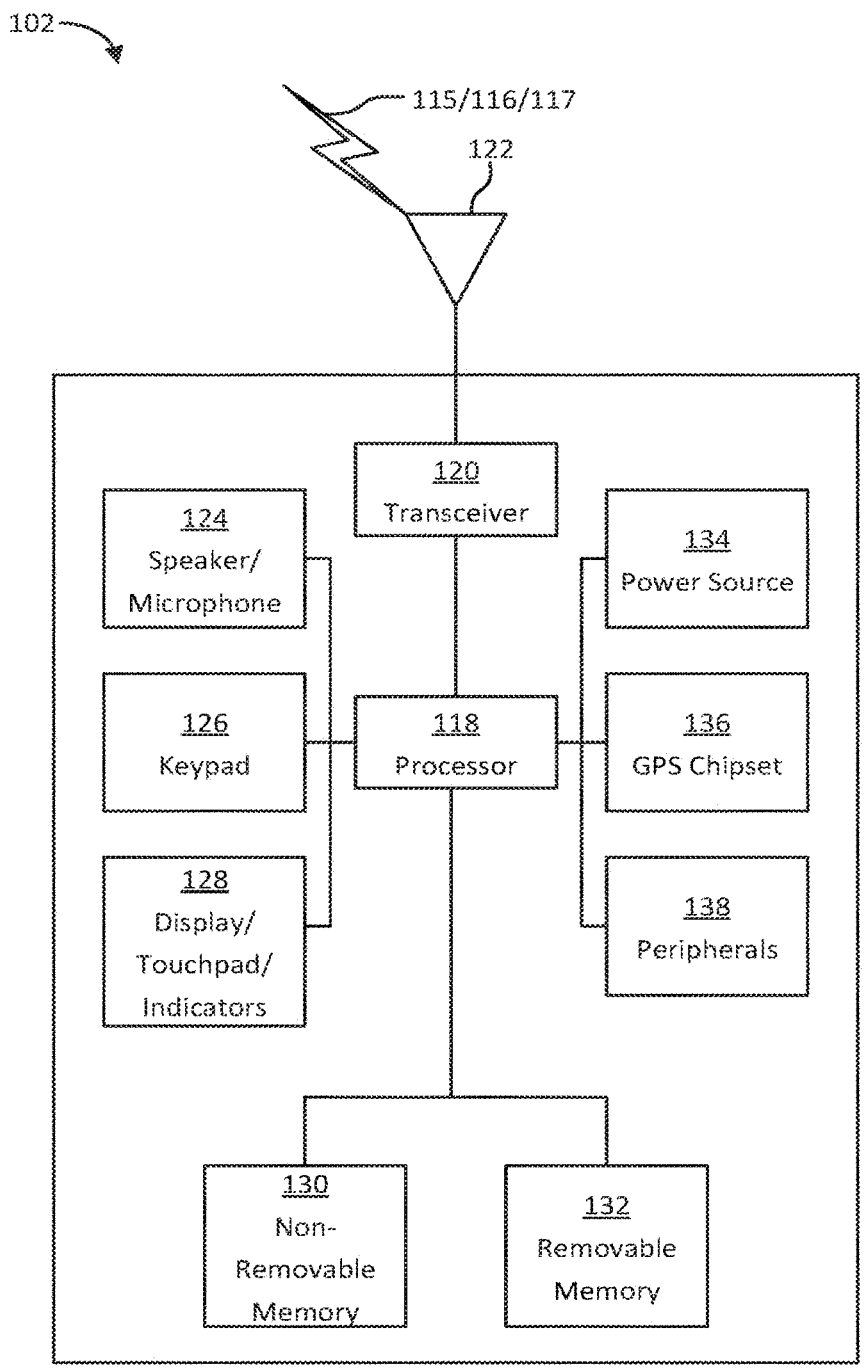
FIG. 25F is a block diagram of an example apparatus or device, such as a WTRU.

FIG. 25F is a block diagram of an example apparatus or device WTRU 102 that may be configured for wireless communications and operations in accordance with the systems, methods, and apparatuses that implement random access with NR-U cells, described herein, such as a WTRU 102 of FIG. 25A, FIG. 25B, FIG. 25C, FIG. 25D, or FIG. 25E, or FIG. 5-FIG. 7 ((e.g., UE 201), among others. As shown in FIG. 25F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 25F may be an exemplary implementation that performs the disclosed systems and methods for random access with NR-U cells described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 25F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 25A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 25F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the random access with NR-U cells methods in some of the examples described herein are successful or unsuccessful, or otherwise indicate a status of random access with NR-U cells and associated components.

The control lighting patterns, images, or colors on the display or indicators 128 may be reflective of the status of any of the method flows or components in the FIG.'s illustrated or discussed herein (e.g., FIG. 5-FIG. 7 and FIG. 10-FIG. 23, etc.). Disclosed herein are messages and procedures of random access with NR-U cells. The messages and procedures may be extended to provide interface/API for users to request resources via an input source (e.g., speaker/microphone 124, keypad 126, or display/touchpad/indicators 128) and request, configure, or query random access with NR-U cells related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 25G:
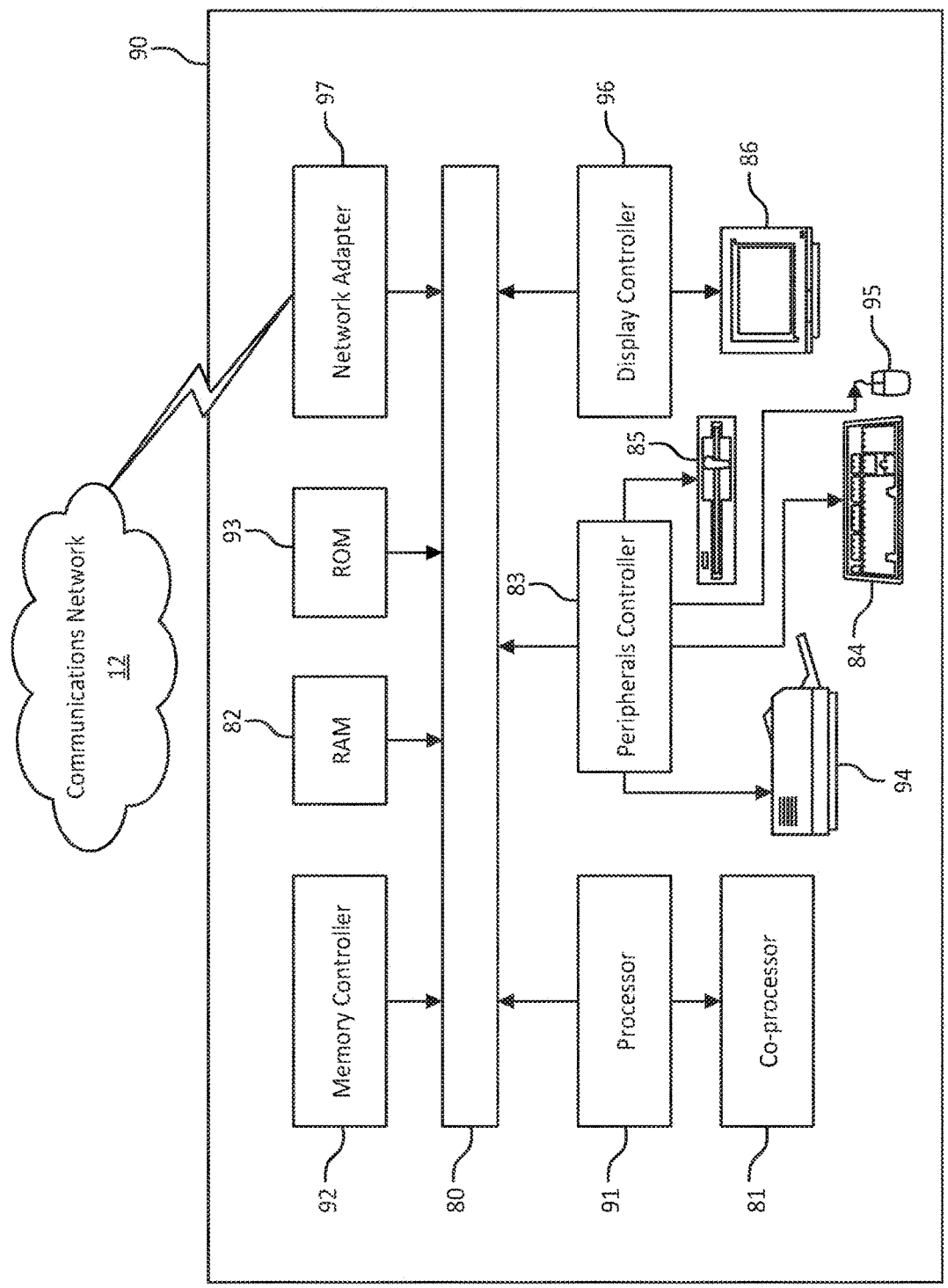
FIG. 25G is a block diagram of an exemplary computing system.

FIG. 25G is a block diagram of an exemplary computing system 90 in which one or more apparatuses of the communications networks illustrated in FIG. 25A, FIG. 25C, FIG. 25D and FIG. 25E as well as random access with NR-U cells, such as the systems and methods illustrated in FIG. 5-FIG. 7 and FIG. 10-FIG. 23 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may obtain, generate, and process data related to the methods and apparatuses disclosed herein for random access with NR-U cells, such as obtaining Msg2.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 25A, FIG. 25B, FIG. 25C, FIG.

25D, or FIG. 25E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—random access with NR-U cells—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for performing wireless communication. A method, system, computer readable storage medium, or apparatus has means for obtaining a message; based on obtaining the message, performing random access resource selection; providing, by a media access control (MAC) layer to a physical (PHY) layer, one or more parameters to configure a preamble transmission; and based on the one or more parameters, performing, by the physical layer a sub-band listen-before-talk (LBT) on a selected bandwidth part (BWP) associated with the one or more parameters. There may be means for when a channel is indicated as free, transmitting a preamble. There may be means for when a channel is indicated as free: transmitting a preamble; and transmitting a random access preamble transmission indication to the MAC layer to indicate the preamble was transmitted. There may be means for when a channel is indicated as free: transmitting a preamble; and transmitting a random access preamble transmission indication to the MAC layer to indicate the preamble was transmitted; and monitoring a physical downlink control channel (PDCCH). There may be means for when a channel is indicated as busy, providing, by the PHY layer to the MAC layer, a random access preamble (RAP) transmission indication that indicates a failure to transmit the preamble; and based on the received RAP indication, performing, by the MAC layer, another random access resource selection using a second selected BWP. The one more parameters may include multiple sets of LBT parameters. There may be means for when a channel is indicated as busy, performing, by the PHY layer multiple LBT attempts based the one more parameters that comprise multiple sets of LBT parameters or multiple indications of sub-bands. There may be means for providing, by the PHY, prioritized random access based on the one or more parameters. The one or more parameters may include a set of LBT parameters. There may be means for monitoring the PDCCH on the same sub-band or BWP on which the preamble was transmitted. The methods, systems, computer readable storage mediums, or apparatuses may provide by the MAC to the PHY multiple sub-bands for transmission; determine that a first sub-band of the multiple subbands is free; and transmit, by the PHY, a preamble on the first sub-band. A method, system, computer readable storage medium, or apparatus has means for detecting an event (e.g., CG addition, initial access, beam failure recovery, among others as disclosed herein); based on the event, performing random access resource selection; providing, by a media access control (MAC) layer to a physical (PHY) layer, one or more parameters to configure a preamble transmission; and based on the one or more parameters, performing, by the physical layer a sub-band listen-before-talk (LBT) on a selected bandwidth part (BWP) associated with the one or more parameters. All combinations in this paragraph (including the removal or addition of steps) are contemplated.

What is claimed:

1. A user equipment comprising circuitry, the circuitry configured to receive, from a network node, a configuration including a first threshold with respect to a first counter for falling back to 4-step random access (RA);

based on confirming that a value of the first counter is not greater than the first threshold, increment a second counter and transmit a MsgA as a 2-step RA preamble transmission to the network node, the second counter being for calculating a RA target power for the 2-step RA preamble transmission;

receive, from the network node, a MsgB as a Random Access Response (RAR) for the 2-step RA preamble transmission, wherein the MsgB is comprised of an indication that a MsgA payload was unsuccessfully decoded and uplink (UL) grant for a Msg3 transmission, wherein the indication that the MsgA payload was unsuccessfully decoded is provided by a field for RA preamble ID in a MAC subheader; and based on detecting the indication, commence with step 3 of the 4-step RA by transmitting, to the network node, a Msg3 on UL resources configured in the UL grant, wherein the Msg3 comprises the MsgA payload.

2. The user equipment of claim 1, the first counter is configured to be increment if a listen before talk (LBT) failure indication is detected.

3. The user equipment of claim 2, wherein the LBT failure indication is provided from a physical (PHY) layer to a media access control (MAC) layer.

4. A network node comprising circuitry, the circuitry configured to transmit, to a user equipment, a configuration including a first threshold with respect to a first counter for falling back to 4-step random access (RA);

receive a MsgA as a 2-step RA preamble transmission to the network node, wherein the MsgA is transmitted after incrementing a second counter based on confirming that a value of the first counter is not greater than the first threshold, the second counter being for calculating a RA target power for the 2-step RA preamble transmission,;

transmit, to the user equipment, a MsgB as a Random Access Response (RAR) for the 2-step RA preamble transmission, wherein the MsgB is comprised of an indication that a MsgA payload was unsuccessfully decoded and uplink (UL) grant for a Msg3 transmission, wherein the indication that the MsgA payload was unsuccessfully decoded is provided by a field for RA preamble ID in a MAC subheader; and receive, from the user equipment, a Msg3 as step 3 of the 4-step RA on UL resources configured in the UL grant based on the indication, wherein the Msg3 comprises the MsgA payload.

5. The network node of claim 4, the first counter is configured to be increment if a listen before talk (LBT) failure indication is detected.

6. The network node of claim 5, wherein the LBT failure indication is provided from a physical (PHY) layer to a media access control (MAC) layer.

7. A method for a network system, the method comprising:

transmitting, to a user equipment, a configuration including a first threshold with respect to a first counter for falling back to 4-step random access (RA);

receiving a MsgA as a 2-step RA preamble transmission to the network node, wherein the MsgA is transmitted after incrementing a second counter based on confirming that a value of the first counter is not greater than the first threshold, the second counter being for calculating a RA target power for the 2-step RA preamble transmission,;

transmitting, to the user equipment, a MsgB as a Random Access Response (RAR) for the 2-step RA preamble transmission, wherein the MsgB is comprised of an indication that a MsgA payload was unsuccessfully decoded and uplink (UL) grant for a Msg3 transmission, wherein the indication that the MsgA payload was unsuccessfully decoded is provided by a field for RA preamble ID in a MAC subheader; and receiving, from the user equipment, a Msg3 as step 3 of the 4-step RA on UL resources configured in the UL grant based on the indication, wherein the Msg3 comprises the MsgA payload.

8. The method of claim 7, the first counter is configured to be increment if a listen before talk (LBT) failure indication is detected.

9. The method of claim 8, wherein the LBT failure indication is provided from a physical (PHY) layer to a media access control (MAC) layer.

* * * * *